US012067867B2

(12) United States Patent
Sievers et al.

(10) Patent No.: US 12,067,867 B2
(45) Date of Patent: Aug. 20, 2024

(54) SYSTEMS AND METHODS FOR IMPROVED TRAFFIC CONDITIONS VISUALIZATION

(71) Applicant: Google LLC, Mountain View, CA (US)

(72) Inventors: Torsten Sievers, Buttelborn (DE); Laurence Moroney, Sammamish, WA (US)

(73) Assignee: GOOGLE LLC, Mountain View, CA (US)

( * ) Notice: Subject to any disclaimer, the term of this patent is extended or adjusted under 35 U.S.C. 154(b) by 817 days.

(21) Appl. No.: 17/052,718

(22) PCT Filed: Sep. 22, 2018

(86) PCT No.: PCT/US2018/052324
§ 371 (c)(1),
(2) Date: Nov. 3, 2020

(87) PCT Pub. No.: WO2020/060571
PCT Pub. Date: Mar. 26, 2020

(65) Prior Publication Data

US 2021/0233393 A1 Jul. 29, 2021

(51) Int. Cl.

| | |
|---|---|
| ***G08G 1/01*** | (2006.01) |
| ***G08G 1/08*** | (2006.01) |
| ***G08G 1/081*** | (2006.01) |

(52) U.S. Cl.
CPC ......... *G08G 1/0145* (2013.01); *G08G 1/0112* (2013.01); *G08G 1/0133* (2013.01); (Continued)

(58) Field of Classification Search
CPC .. G08G 1/0145; G08G 1/0112; G08G 1/0133; G08G 1/0141; G08G 1/08; G08G 1/081; G08G 1/012
See application file for complete search history.

(56) References Cited

U.S. PATENT DOCUMENTS

| | | | |
|---|---|---|---|
| 9,964,414 | B2 | 5/2018 | Slavin et al. |
| 2002/0198694 | A1 | 12/2002 | Yang et al. |

(Continued)

FOREIGN PATENT DOCUMENTS

| | | |
|---|---|---|
| CN | 104240500 | 12/2014 |
| CN | 104637313 | 5/2015 |

(Continued)

OTHER PUBLICATIONS

Chinese Search Report Corresponding to Application No. 2018800978523 on Apr. 15, 2022.

(Continued)

*Primary Examiner* — Brian P Sweeney
(74) *Attorney, Agent, or Firm* — DORITY & MANNING P.A.

(57) ABSTRACT

In one example embodiment, a computer-implemented method for determining traffic conditions includes obtaining traffic sample data associated with a first direction of traffic on a first road segment, the traffic sample data including data indicative of a plurality of movement speeds associated with a plurality of objects. The method includes determining a plurality of average traffic speeds for the first direction of traffic on the first road segment based at least in part on the plurality of movement speeds. The method includes associating each of the plurality of average traffic speeds with at least one of a plurality of traffic types. The method includes determining map data based at least in part on the plurality of traffic types and associated average traffic speeds. The method includes transmitting to a client device in response to a request, map data corresponding to at least one of the plurality of traffic types.

20 Claims, 14 Drawing Sheets

(52) U.S. Cl.
CPC ............ *G08G 1/0141* (2013.01); *G08G 1/08* (2013.01); *G08G 1/081* (2013.01)

(56) References Cited

U.S. PATENT DOCUMENTS

| | | | | |
|---|---|---|---|---|
| 2012/0173530 | A1* | 7/2012 | Kurciska | G06F 16/29 707/738 |
| 2015/0262480 | A1 | 9/2015 | Fowe et al. | |
| 2017/0089717 | A1 | 3/2017 | White et al. | |
| 2018/0038703 | A1 | 2/2018 | Verma et al. | |
| 2018/0261082 | A1* | 9/2018 | Shen | G08G 1/0116 |

FOREIGN PATENT DOCUMENTS

| | | | |
|---|---|---|---|
| CN | 105074793 | | 11/2015 |
| EP | 2444777 | | 4/2024 |
| JP | H 09/311996 | | 12/1997 |
| JP | 2005/061988 | | 3/2005 |
| JP | 2007/057468 | | 3/2007 |
| JP | 2004/325366 | | 9/2007 |
| JP | 2007/263791 | | 10/2007 |
| JP | 2008/164425 | | 7/2008 |
| JP | 2008/209208 | | 9/2008 |
| JP | 2007/114118 | | 1/2012 |
| JP | 2012/145401 | | 8/2012 |
| JP | 2014507024 | | 12/2012 |
| JP | 2014/507024 | | 3/2014 |
| JP | 2016162084 | | 5/2016 |
| JP | 2016/162084 | | 9/2016 |
| KR | 2011/0087664 | | 11/2012 |
| WO | WO 2009/118987 | | 10/2009 |
| WO | WO 2009118987 | A1 * | 10/2009 |
| WO | WO 2010/129072 | | 11/2010 |
| WO | WO 2010/129072 | A1 * | 11/2010 |

OTHER PUBLICATIONS

International Preliminary Report on Patentability for PCT/US2018/052324, mailed on Apr. 1, 2021, 16 pages.
Barth, "Official Google Blog: The Bright Side of Sitting in Traffic: Crowdsourcing Road Congestion Areas", Aug. 25, 2009, https://googleblog.blogspot.com/2009/08/bright-side-of-sitting-in-traffic.html, retrieved on Oct. 27, 2020, 4 pages.
International Search Report for PCT/US2018/052324, mailed on Sep. 25, 2019, 6 pages.

* cited by examiner

SYSTEMS AND METHODS FOR IMPROVED TRAFFIC CONDITIONS VISUALIZATION

PRIORITY CLAIM

The present application is national stage filing under 35 U.S.C. § 371 of Patent Cooperation Treaty Application Number PCT/US2018/052324 having a filing date of Sep. 22, 2018. Applicant claims priority to and the benefit of each of such application and incorporates all such application herein by reference in their entirety.

FIELD

The present disclosure relates generally to providing traffic condition information.

BACKGROUND

A geographic information system (GIS) is a system for archiving, retrieving, and manipulating data that has been stored and indexed according to the geographic coordinates of its elements. The system generally can utilize a variety of data types, such as imagery, maps, and tables. GIS technology can be integrated into Internet-based mapping applications.

Such mapping applications can be, or can otherwise be associated with, software applications that display interactive digital maps. For example, mapping applications may run on laptop and tablet computers, mobile phones, car navigation systems, hand-held global positioning system (GPS) units, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

Traffic condition information can be visualized by displaying a different color depending on the speed of cars on a road. However, this can be misleading in some instances.

SUMMARY

Aspects and advantages of the present disclosure will be set forth in part in the following description, or may be learned from the description, or may be learned through practice of the embodiments.

This specification generally describes methods and systems for providing improved traffic information by providing traffic-type specific traffic information. Different types of traffic might travel at different speeds. For instance, certain vehicles might qualify for use of faster traffic lanes such as high occupancy toll lanes or express toll lanes, or lanes that are reserved for particular vehicle types (such as trucks or busses). Determining the average traffic speed along a route without taking into account such lanes is likely to lead to inaccurate average traffic speeds. Furthermore, providing the wrong type of traffic information to a specific user or vehicle type is likely to result in an inaccurate representation of the traffic conditions. In light of the above, the methods and systems described herein provide means for calculating traffic speeds for different traffic types, well as means for providing the correct the type of traffic information in response to a request for traffic information.

One example aspect of the present disclosure is directed to a computer-implemented method for determining traffic conditions. The method includes obtaining traffic sample data associated with a first direction of traffic on a first road segment, the traffic sample data including data indicative of a plurality of movement speeds associated with a plurality of objects. The method includes determining a plurality of average traffic speeds for the first direction of traffic on the first road segment based at least in part on the plurality of movement speeds. The method includes associating each of the plurality of average traffic speeds with at least one of a plurality of traffic types. The method includes determining map data based at least in part on the plurality of traffic types and associated average traffic speeds. The method includes transmitting to a client device in response to a request, map data corresponding to at least one of the plurality of traffic types.

Another example aspect of the present disclosure is directed to a computer-implemented method for determining traffic conditions. The method includes receiving one or more requests for traffic condition information from a user, the one or more requests including data indicative of a first location, a second location, and a traffic type. The method includes determining a first transit route from the first location to the second location, the first transit route including one or more transit areas associated with a first traffic type from a plurality of traffic types. The method includes determining map data indicative of a first transit time for the first transit route, the first transit time corresponding to a traffic speed associated with the first traffic type. The method includes providing the map data to the user in response to the request for traffic condition information.

Another example aspect of the present disclosure is directed to a computing system. The computing system includes one or more processors and one or more tangible, non-transitory, computer readable media that collectively store instructions that when executed by the one or more processors cause the computing system to perform operations. The operations include receiving one or more requests for transit information from a user, the one or more requests including data indicative of a first location, a second location, and a traffic type from a user. The operations include determining a first transit route from the first location to the second location, the first transit route including one or more transit areas associated with a first traffic type from a plurality of traffic types. The operations include identifying a first transit area from the one or more transit areas, the first transit area being associated with two or more traffic types from the plurality of traffic types, the two or more traffic types including the first traffic type and a second traffic type from the plurality of traffic types. The operations include determining a first transit time and a second transit time for the first transit route, the first transit time corresponding to a traffic speed associated with the first traffic type and the second transit time corresponding to a traffic speed associated with the second traffic type. The operations include associating the first traffic type or the second traffic type with the user, based at least in part on the first transit time, the second transit time, and the data indicative of the traffic type received from the user. The operations include providing the map data to the user in response to the request for transit information, the map data corresponding to the traffic type associated with the user.

Another example aspect of the present disclosure is directed to a computer-implemented method for determining traffic conditions. The method includes receiving, by one or more computing devices, a request for traffic condition information from a user, the request including data indicative of a first location, a second location, and a first traffic type. The method includes determining, by the one or more computing devices, one or more transit routes from the first location to the second location, each transit route including one or more road segments that are associated with the first traffic type. The method includes determining, by the one or more computing devices, traffic condition information associated with traffic corresponding to the first traffic type for each of the one or more transit routes. The method includes determining, by the one or more computing devices, map data indicative of traffic condition information associated with traffic corresponding to the first traffic type for at least one of the one or more transit routes. The method includes providing, by the one or more computing devices, the map data to the user in response to the request for traffic condition information.

Another example aspect of the present disclosure is directed to a computer-implemented method for determining traffic conditions. The method includes receiving, by one or more computing devices, a request for traffic condition information from a user, the request including data indicative of one or more road segments. The method includes obtaining, by the one or more computing devices, at least one of user data or vehicle data indicative of a traffic type associated with the request for traffic condition information. The method includes determining, by the one or more computing devices, map data including traffic condition information associated with traffic corresponding to the traffic type for the one or more road segments. The map data is determined based at least in part on the user data or vehicle data indicative of the traffic type associated with the request for traffic condition information. The method includes providing, by the one or more computing devices, the map data to the user in response to the request for traffic condition information.

Other example aspects of the present disclosure are directed to systems, methods, vehicles, apparatuses, tangible, non-transitory computer-readable media, and memory devices for determining traffic conditions.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
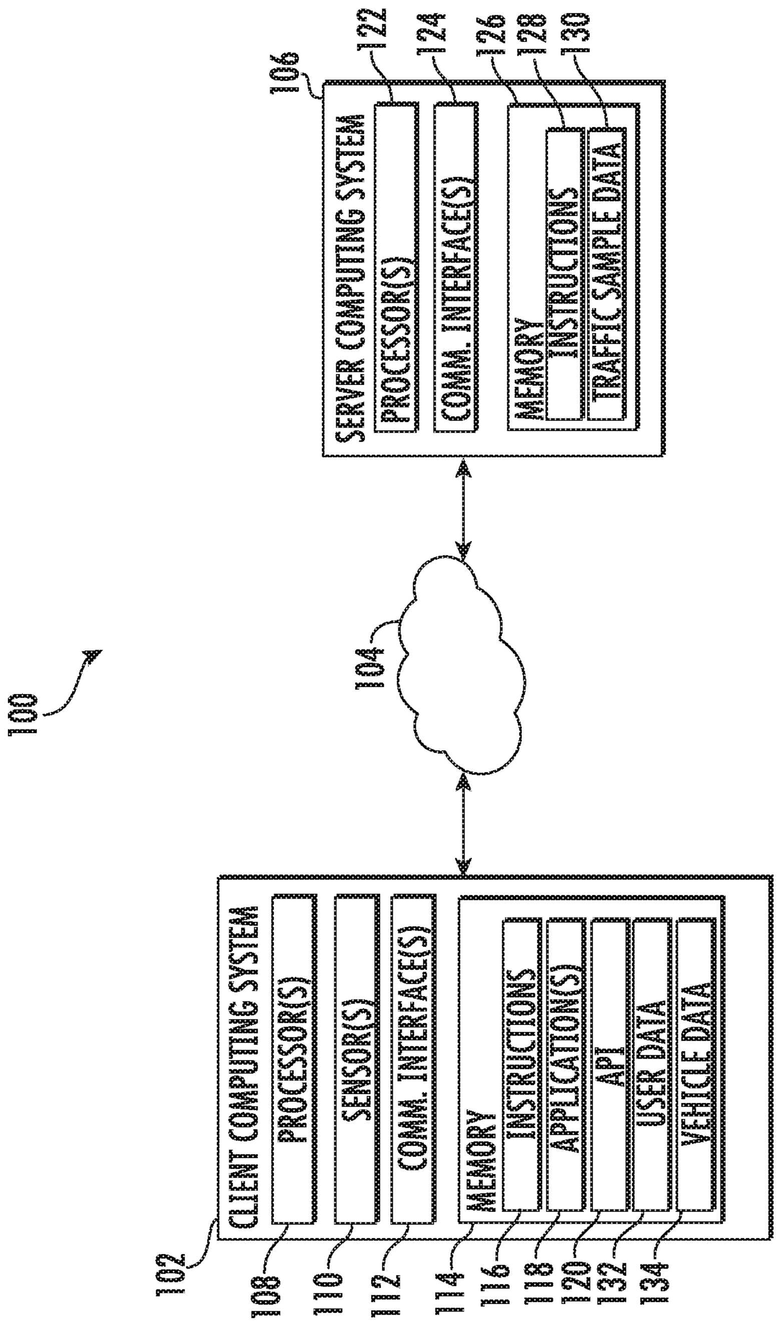
FIG. 1 depicts an example computing environment according to example embodiments of the present disclosure.

Reference numerals that are repeated across plural figures are intended to identify the same components or features in various implementations.

DETAILED DESCRIPTION

Example aspects of the present disclosure are directed to methods and systems for determining traffic condition information. In particular, a geographic information service can obtain traffic sample data indicative of traffic (e.g., vehicle traffic, bicycle traffic, pedestrian traffic, etc.) associated with a plurality of objects (e.g., vehicles, bicycles, pedestrians, etc.) within a transit area. The geographic information service can determine one or more average traffic speeds associated with the transit area (e.g., one or more average traffic speeds of traffic within the transit area) based on the traffic sample data, and the geographic information service can associate each average traffic speed with at least one of a plurality of traffic types. The plurality of traffic types can include, for example, normal traffic, express traffic (e.g., high-occupancy vehicle (HOV) traffic, toll lane traffic), traffic relating to a certain category of vehicle (e.g. trucks or buses, which may be required to use a certain traffic lane), etc. The geographic information service can determine traffic condition information for the transit area based on the plurality of traffic types and associated average traffic speeds. In response to a request for traffic condition information, the geographic information service can determine map data indicative of the traffic condition information, and transmit the map data that corresponds to at least one of the plurality of traffic types to the requesting entity.

According to aspects of the present disclosure, the traffic condition information can include, for example, data indicative of one or more traffic speeds associated with traffic corresponding to one or more traffic types within a transit area, an approximate transit time through the transit area, and/or other information associated with travel in the transit area.

In some implementations, the transit area can include one or more road segments. Each road segment can include one or more traffic lanes, and each traffic lane can be associated with a traffic type (e.g., normal traffic, express traffic, traffic of a specific vehicle category, etc.), a direction of traffic, and/or a reference traffic speed (e.g., speed limit). The traffic sample data can include a speed and direction of traffic on a road segment. In some implementations, the traffic sample data can include a traffic lane and/or a traffic type associated with traffic on the road segment. The traffic condition information can include one or more traffic speeds (e.g., average traffic speeds) of traffic on a road segment in each of one or more directions of traffic associated with the road segment. The traffic condition information can also include one or more transit times for traffic on the road segment (e.g., time to travel from a first end of a road segment to a second end of the road segment based on the traffic speed).

In some implementations, a transit route from a first location to a second location can include one or more transit areas. The traffic condition information can include one or more traffic speeds (e.g., one or more average traffic speeds) of traffic on each road segment of the one or more transit areas in the transit route. The one or more traffic speeds can each be associated with traffic corresponding to a different traffic type. The traffic condition information can also include one or more transit times (e.g., time to travel from a first end to a second end) for traffic on each road segment. The one or more transit times can each be associated with traffic corresponding to a different traffic type. In some implementations, the traffic condition information can include one or more traffic speeds for the transit route as a whole (e.g., an average traffic speed of traffic on each road segment weighted by a distance associated with the road segment, for traffic corresponding to one or more different traffic types), and/or one or more transit times for the transit route as a whole (e.g., a time to travel from the first location to the second location via the transit route, for traffic corresponding to one or more different traffic types).

In some implementations, the traffic condition information can include an identifier such as a numerical value for the one or more traffic speeds. Alternatively, the traffic condition information can include an identifier corresponding to a predetermined range of traffic speeds (e.g., a color-coded identifier). The identifier can be used in association with a graphical user interface (GUI) to provide the traffic condition information to the user. For example, the GUI can include a map of a plurality of road segments that are displayed based on a color-coded identifier associated with each road segment. Each road segment in the map can be displayed with a color, shading, or other visual characteristic that corresponds to the color-coded identifier associated with the road segment. The use of color-coded identifiers is provided by way of example only. It will be appreciated that any type of visual, audible, or other identifier can be provided in association with the graphical user-interface to differentiate traffic speeds.

As an example, if a traffic speed for a road segment exceeds a speed limit for the transit area by at least a first threshold amount, then the traffic condition information can include a first identifier associated with the road segment (e.g., a color-coded identifier that is "green"). If a traffic speed for the road segment is equal to the speed limit or exceeds the speed limit by less than the first threshold amount, then the traffic condition information can include a second identifier associated with the road segment (e.g., a color-coded identifier that is "yellow"). If a traffic speed for the road segment is less than the speed limit for the road segment, then the traffic condition information can include a third color-coded identifier associated with the road segment (e.g., a color-coded identifier that is "red").

As another example, the traffic condition information can include a first identifier (e.g., a color-coded identifier that is "red") associated with a road segment if a traffic speed for the road segment is less than a speed limit for the road segment by at least a first threshold amount. The traffic condition information can include a second identifier associated with the road segment (e.g., a color-coded identifier that is "yellow") if a traffic speed for the road segment is less than the speed limit for the road segment by less than the first threshold amount. The traffic condition information can include a third identifier associated with the road segment (e.g., a color-coded identifier that is "green") if a traffic speed for the road segment is equal to or greater than the speed limit for the road segment.

As another example, if an average traffic speed on a road segment is 50 mph, then the traffic condition information can include data indicative of 50 mph for the road segment. Alternatively, if an average traffic speed of normal traffic on the road segment is 40 mph and an average traffic speed of express traffic on the road segment is 60 mph, then the traffic condition information can include data indicative of 40 mph corresponding to normal traffic on the road segment and/or data indicative of 60 mph corresponding to express traffic on the road segment.

As another example, consider an average traffic speed for a road segment that is 50 mph, a speed limit associated with the road segment that is 40 mph, and a first threshold that is 5 mph. The traffic speed for the road segment exceeds the speed limit by at least the first threshold amount of 5 mph in this example. Accordingly, the traffic condition information can include the "green" color-coded identifier for the road segment. Alternatively, if the speed limit associated with the road segment is 45 mph, and the first threshold is 10 mph, then the traffic speed for the road segment exceeds the speed limit by less than the first threshold amount of 10 mph and the traffic condition information can include the "yellow" color-coded identifier for the road segment. Alternatively, if the speed limit associated with the road segment is 55 mph, then the traffic speed for the road segment is less than the speed limit and the traffic condition information can include the "red" color-coded identifier.

In accordance with example embodiments, an application programming interface (API) can be provided. For example, the API can be provided by a server computing system as part of the geographic information service to enable one or more applications executing on a client computing system to interface with the server to exchange data associated with traffic. The server computing system can include one or more computing devices (e.g., computers, servers, mainframes, virtual computing platforms, and/or the like). The client computing system can include one or more computing devices (e.g., computers (e.g., desktop computers, laptop computers, and/or the like) mobile computing devices (e.g., tablet computers, smartphones, and/or the like), wearable computing devices (e.g., smart watches, and/or the like), and/or the like, vehicle computing devices (e.g., vehicle computing system, navigation system, etc.)) associated with a common (or the same) user. In some examples, the API can be provided at the client computing system as part of the geographic information service to enable one or more applications executing on the client computing system to exchange data with the server computing system. In some implementations, a single computing system can include the server computing system and the client computing system. In some implementations, a client computing system can utilize the API to communicate with the server computing system to obtain traffic condition information about a transit area. For example, the API can receive a call from one of the applications requesting traffic condition information about one or more transit areas (e.g., one or more road segments). In response to a call received through the API, the server computing system can return traffic condition information to the requesting application through the API.

According to aspects of the present disclosure, an API call for requesting traffic condition information about a transit area can include, for example, data indicative of the transit area (e.g., an identifier corresponding to the transit area). In some implementations, the API can receive an API call from an application requesting traffic condition information about one or more road segments (e.g., the API call can include one or more identifiers corresponding to the one or more road segments). In some implementations, the API can receive an API call from an application requesting traffic condition information about a transit route between a first location and a second location. In some implementations, the API call can include a traffic type (e.g., normal traffic, express traffic, traffic for a specific vehicle category, etc.).

As an example, in response to an API call that includes data indicative of one or more road segments, the geographic information service can determine traffic condition information about the road segment(s) (e.g., via the server computing system), such as, for example, one or more traffic speeds (e.g., one or more average traffic speeds associated with a direction of traffic) of traffic on the road segment(s), and/or a transit time for traffic on the road segment(s). Each of the one or more traffic speeds can be associated with traffic corresponding to a different traffic type. The geographic information service can return the traffic condition information to the requesting application via the API.

As another example, in response to an API call that includes data indicative of one or more road segments and a traffic type, the geographic information service can determine traffic condition information about the road segment(s) (e.g., via the server computing system) based on the traffic type, such as, for example, a traffic speed associated with traffic corresponding to the traffic type, and/or a transit time associated with traffic corresponding to the traffic type. The geographic information service can determine the transit time associated with traffic corresponding to the traffic type for the road segment(s) based on, for example, the traffic speed associated with traffic corresponding to the traffic type and a distance associated with the road segment(s). The geographic information service can return the traffic condition information to the requesting application.

As another example, in response to an API call that includes data indicative of a first location and a second location, the geographic information service can determine one or more transit routes from the first location to the second location (e.g., via the server computing system). The transit route(s) can include one or more road segments between the first location and the second location. In some implementations, two or more transit routes can each include one or more road segments in common. The geographic information service can determine traffic condition information about the road segment(s) in the transit route(s), such as, for example, one or more traffic speeds of traffic on the road segment(s) and/or one or more transit times for traffic on the road segment(s), as described above. Additionally, or alternatively, the traffic condition information can include one or more traffic speeds for the transit route(s) as a whole, and/or one or more transit times for the transit route(s) as a whole, as described above. The geographic information service can return the traffic condition information to the requesting application.

As another example, in response to an API call that includes data indicative of a first location, a second location, and data indicative of a traffic type, the geographic information service can determine one or more transit routes from the first location to the second location (e.g., via the server computing system). The transit route(s) can include one or more road segments between the first location and the second location. In some implementations, two or more transit routes can each include one or more road segments in common. The geographic information service can determine traffic condition information about the road segment(s) in the transit route(s), such as, for example, a traffic speed associated with traffic corresponding to the traffic type on the road segment(s) and/or a transit time associated with traffic corresponding to the traffic type on the road segment(s). The geographic information service can return the traffic condition information to the requesting application.

As another example, in response to an API call that includes data indicative of a first location, a second location, and data indicative of a traffic type, the geographic information service can determine one or more transit routes from the first location to the second location (e.g., via the server computing system) based on the traffic type. For example, if the traffic type is HOV traffic, then the geographic information service can determine the one or more transit routes such that each road segment in the transit route(s) includes at least one traffic lane associated with HOV traffic: if the traffic type is traffic relating to a specific category of vehicle, then the geographic information service can determine the one or more transit routes such that each road segment in the transit route(s) includes at least one traffic lane associated with traffic relating to the specific category of vehicle: etc. The geographic information service can determine traffic condition information about the road segment(s) in each of the one or more determined transit routes as described above (e.g., one or more traffic speeds and/or one or more transit times), and return the traffic condition information to the requesting application.

An automated process for route planning may comprise determining a respective score for each of a plurality of candidate transit routes, and selecting a candidate transit route based on the respective scores, e.g. to present as a proposal to a user, or to implement in an autonomous vehicle. Each candidate transit route can include one or more road segments that are each associated with traffic corresponding to a particular traffic type. For example, if a first transit route includes a first road segment, and the first road segment is associated with traffic corresponding to a first traffic type and a second traffic type, then the first transit route can include a first candidate transit route (associated with traffic corresponding to the first traffic type) and a second candidate transit route (associated with traffic corresponding to the second traffic type). The score for each candidate transit route may be determined using the corresponding traffic condition information for the traffic type, e.g. using the traffic speed or transit time associated with the traffic type for the candidate transit route.

According to aspects of the present disclosure, the API can facilitate communication with the server computing system to obtain traffic condition information about a transit area. The server computing system can obtain traffic sample data indicative of traffic (e.g., vehicle traffic, pedestrian traffic, other traffic, etc.) on one or more road segments in one or more transit areas. The traffic sample data can include at least a position at a first time and a position at a second time of one or more objects (e.g., vehicles, pedestrians, etc.) on the one or more road segments. The server computing system can obtain the traffic sample data from one or more data sources, such as, for example, observations supplied by humans, a network of traffic sensors, and/or one or more mobile data sources associated with one or more objects from the plurality of objects (e.g., a smartphone on a person or in a vehicle). The server computing system can determine a movement speed associated with each of the plurality of objects based on the traffic sample data, and determine one or more traffic types (e.g., normal traffic, express traffic, traffic for a specific vehicle category, etc.) corresponding to the plurality of objects based on the movement speed. In some implementations, the server computing system can determine that the one or more road segments are associated with one or more traffic types based on the traffic sample data. For example, if the traffic sample data indicates that traffic on a road segment includes traffic corresponding to one or more traffic types, then the server computing system can determine that the road segment is associated with the one or more traffic types (e.g., that the road segment includes one or more traffic lanes associated with the one or more traffic types).

In some implementations, the server computing system can obtain traffic sample data indicative of traffic on a road segment, the traffic sample data indicating a movement speed of one or more objects on the road segment. The server computing system can determine one or more traffic speeds associated with the road segment based on the traffic sample data. The server computing system can determine the one or more traffic speeds for each direction of traffic associated with the road segment.

As an example, the server computing system can determine an average traffic speed of traffic on the road segment, based on the traffic sample data (e.g., an average movement speed associated with each of the plurality of objects on the road segment for each direction of traffic associated with the road segment).

As another example, the server computing system can determine a distribution of a plurality of movement speeds associated with the plurality of objects on the road segment. The server computing system can determine a traffic speed for the road segment based on a global peak of the distribution. Alternatively, the server computing system can determine a first traffic speed for the road segment based on a first local peak of the distribution, and determine a second traffic speed for the road segment based on a second local peak of the distribution. The server computing system can determine the first local peak based on a first cluster of movement speeds in the distribution, and determine the second local peak based on a second cluster of movement speeds in the distribution. In this way, the server computing system can determine a plurality of traffic speeds for the road segment based on a plurality of local peaks of the distribution.

The term "peak" may be defined according to a peak definition criterion, such as a predetermined peak definition criterion. The term "global peak" may refer to the peak for which the distribution has its highest frequency value. "Local peak" may refer to a peak other than the global peak.

In one example, a clustering algorithm can be applied to the plurality of movement speeds to adaptively identify two (or more) clusters in the movement speeds, each of which is identified as a respective peak. The number of clusters may be identified based on a clustering statistical significance criterion. The clustering algorithm may further identify a spread value for each cluster indicative of a respective range of speeds associated with each cluster, and movement speeds may be regarded as associated with one of the clusters if they are within the corresponding range.

Alternatively, if the distribution is defined in terms of respective proportion values for each of a plurality of successive speed ranges (e.g. non-overlapping speed ranges) which may span equal ranges of speed, where each proportion value is indicative of the proportion of the objects which travel at a speed within the respective speed range, the peak definition criterion may be that a given speed range constitutes a peak if the proportion value for that speed range is greater than the proportion value for a neighboring lower speed range and the proportion value for a neighboring higher speed range.

In some implementations, the server computing system can obtain traffic sample data indicative of traffic on a road segment, the traffic sample data indicating a movement speed of one or more objects on the road segment. The server computing system can determine one or more traffic types associated with the road segment based on the traffic sample data. The server computing system can determine the one or more traffic types for each direction of traffic associated with the road segment.

As an example, the server computing system can determine one or more traffic speeds for the road segment based on the traffic sample data, as described above. If the server computing system determines a single traffic speed for the road segment, then the server computing system can determine that the single traffic speed is associated with traffic that corresponds to a single traffic type and that the road segment is associated with the single traffic type (e.g., the road segment includes one or more traffic lanes associated with the single traffic type, such as normal traffic). If the server computing system determines two or more traffic speeds for the road segment, then the server computing system can determine that the two or more traffic speeds are associated with traffic that corresponds to two or more traffic types and that the road segment is associated with the two or more traffic types (e.g., the road segment includes one or more traffic lanes associated with the two or more traffic types). In this way, the server computing system can determine a plurality of traffic types associated with the road segment based on a plurality of traffic speeds for the road segment.

In some implementations, the server computing system can obtain traffic sample data indicative of traffic on a road segment, the traffic sample data indicating a movement speed and traffic type of one or more objects on the road segment. The server computing system can determine one or more traffic types associated with the road segment based on the traffic sample data.

As an example, if the traffic sample data is indicative of traffic corresponding to express traffic on the road segment, then the server computing system can determine that the road segment is associated with express traffic (e.g., the road segment includes one or more traffic lanes associated with express traffic). As another example, if the traffic sample data is indicative of traffic corresponding to traffic relating to a certain category of vehicle, then the server computing system can determine that the road segment is associated with traffic relating to the certain category of vehicle (e.g., the road segment includes one or more traffic lanes associated with traffic relating to the certain category of vehicle). As another example, if the traffic sample data is indicative of traffic corresponding to a plurality of different traffic types on the road segment, then the server computing system can determine that the road segment is associated with the plurality of different traffic types (e.g., the road segment includes one or more traffic lanes associated with the plurality of different traffic types).

In some implementations, the server computing system can obtain data indicative of one or more attributes associated with a road segment in a transit area (e.g., road segment attribute data). The one or more attributes can include, for example, a distance associated with the road segment, one or more traffic lanes in the road segment that are designated for traffic corresponding to one or more traffic types (e.g., traffic lane(s) designated for normal traffic, express traffic, and/or traffic relating to a certain category of vehicle, etc.). The server computing system can determine one or more traffic types associated with the road segment based on the road segment attribute data.

As an example, the server computing system can determine a first traffic speed and a second traffic speed associated with traffic on a road segment based on traffic sample data indicative of traffic on the road segment, as described above. If road segment attribute data associated with the road segment indicates that the road segment includes one or more traffic lanes designated for normal traffic, then the server computing system can determine that both the first traffic speed and the second traffic speed correspond to normal traffic, and that the road segment is associated with normal traffic. Alternatively, if road segment attribute data associated with the road segment indicates that the road segment includes at least one traffic lane designated for normal traffic and at least one traffic lane designated for express traffic, then the server computing system can determine that the first traffic speed corresponds to normal traffic and the second traffic speed corresponds to express traffic, and that the road segment is associated with normal traffic and express traffic.

In some implementations, the server computing system can obtain traffic sample data indicative of traffic on a road segment, the traffic sample data indicating a movement and a traffic lane of one or more objects on the road segment, and obtain road segment attribute data associated with the road segment indicative of one or more designated traffic lanes. The server computing system can determine one or more traffic types corresponding to the traffic based on the traffic sample data and road segment attribute data.

[00$7] As an example, if the road segment attribute data associated with the road segment indicates that the road segment includes a first traffic lane designated for HOV traffic, and the traffic sample data is indicative of traffic on the first traffic lane of the road segment, then the server computing system can determine that the traffic on the first traffic lane corresponds to HOV traffic. The server computing system can determine an average movement speed of the traffic on the first traffic lane to determine an average traffic speed of traffic corresponding to HOV traffic on the road segment. Alternatively, if the road segment attribute data associated with the road segment indicates that the road segment includes a plurality of traffic lanes designated for HOV traffic, and the traffic sample data is indicative of traffic on the plurality of traffic lanes of the road segment, then the server computing system can determine an average movement speed of the traffic on the plurality of traffic lanes to determine an average traffic speed of traffic corresponding to HOV traffic on the road segment.

According to aspects of the present disclosure, an application can request traffic condition information about a transit area via the API. In some implementations, the application can include a user interface (e.g., a graphical user interface). A user can interact with the application via the user interface in order to request and obtain the traffic condition information about the transit area.

As an example, a user can request traffic condition information about a first transit area from the application via the user interface. The application can send an API call that includes data indicative of the first transit area (e.g., an identifier associated with the first transit area) to the server computing system. In response to the API call, the server computing system can determine map data indicative of traffic condition information for the first transit area, and provide the map data to the application through the API. The application can provide the map data to the user via the user interface.

As another example, a user can request traffic condition information about a first transit area from the application via the user interface. In response to the request, the application can prompt the user (e.g., via the user interface) for a traffic type, and the user can indicate a traffic type. For example, the user can indicate normal traffic for the traffic type if the user will travel alone, or the user can indicate express traffic for the traffic type if the user will travel with one or more additional passengers. Additionally, or alternatively, the user can indicate a certain category of vehicle for the traffic type. The application can send an API call that includes data indicative of the first transit area and the traffic type indicated by the user to the server computing system. In response to the API call, the server computing system can determine map data indicative of traffic condition information associated with traffic corresponding to the indicated traffic type for the first transit area, and provide the map data to the application through the API. The application can provide the map data to the user via the user interface.

As another example, a user can request traffic condition information about a first transit area from the application via the user interface. In response to the request, the application can prompt the user (e.g., via the user interface) for a number of passengers. If the user will travel alone, then the user can indicate a single passenger. If the user will travel with one or more additional passengers, then the user can indicate two or more passengers for the number of passengers. The application can determine a traffic-type that corresponds to the number of passengers (e.g., an indication of a single passenger can correspond to normal traffic, and an indication of two or more passengers can correspond to HOV traffic). The application can send an API call that includes data indicative of the first transit area and the determined traffic type to the server computing system. In response to the API call, the server computing system can determine map data indicative of traffic condition information associated with traffic corresponding to the determined traffic type for the first transit area and provide the map data to the application through the API. The application can provide the map data to the user via the user interface.

In some implementations, in response to a user request for traffic condition information, the application can obtain user data indicative of a traffic type associated with the request.

As an example, a user can request traffic condition information about a first transit area from the application via the user interface, and the user can include an indication of a traffic type or a number of passengers with the request before receiving a prompt for the information from the application. The application can send an API call that includes data indicative of the transit area and the traffic type indicated by the user to the server computing system. In response to the API call, the server computing system can determine map data indicative of traffic condition information associated with the traffic type for the transit area, and provide the map data to the application through the API. The application can provide the map data to the user via the user interface.

As another example, a user can request traffic condition information about a first transit area from the application via the user interface. In response to the request, the application can obtain user data that is indicative of a traffic type associated with the request for traffic condition information about the first transit area. The user data can include one or more preferences of the user, such as, for example, whether the user prefers to view traffic condition information associated with normal traffic, HOV traffic, toll lane traffic, or other traffic types.

As another example, a user can request traffic condition information about a first transit area from the application via the user interface. In response to the request, the application can obtain user data that is indicative of a traffic type associated with the request for traffic condition information about the first transit area. The user data can include contextual information of the user that the application can use to determine the traffic type associated with the request. For example, if the application obtains contextual information including a schedule of the user and the application determines that the request coincides with a daily solo commute of the user based on the schedule, then the application can determine that the request is for traffic condition information corresponding to normal traffic. If the application obtains contextual information including a schedule of the user and the application determines that the request coincides with a daily carpool commute of the user based on the schedule, then the application can determine that the request is for traffic condition information corresponding to HOV traffic. If the application obtains contextual information including a calendar event that is shared with one or more other users and the application determines that a location of the calendar event includes the first transit area, then the application can determine that the request is for traffic condition information corresponding to HOV traffic. The application can send an API call that includes data indicative of the first transit area and the traffic type determined by the application to the server computing system. In response to the API call, the server computing system can determine map data indicative of traffic condition information associated with the traffic type for the first transit area and provide the map data to the application through the API. The application can provide the map data to the user via the user interface. The use of a schedule or calendar event is provided by way of example only. It will be appreciated that any type of contextual information indicative of a traffic type (e.g., location history, travel history/itinerary, purchase history (e.g., purchase of an electric vehicle that is permitted to travel in an HOV traffic lane), and/or the like) can be used to determine the traffic type associated with the request for traffic condition information.

In some implementations, in response to a user request for traffic condition information, the application can determine a vehicle associated with the request (e.g., a vehicle owned by the user, a vehicle that the user is using at the time of the request, etc.). The application can obtain vehicle data associated with the vehicle to determine a traffic type associated with the request.

As an example, a user can request traffic condition information about a first transit area from the application via the user interface. In response to the request, the application can obtain vehicle data indicative of a specific category of the vehicle associated with the request. The vehicle data can include a vehicle make/model, vehicle weight, vehicle dimensions, vehicle type (e.g. truck, car, etc.), vehicle engine type (e.g. electric, petrol, diesel, etc.), vehicle emissions data, or other information indicative of a specific category of the vehicle. The application can obtain the vehicle data from one or more computing devices associated with the vehicle (e.g., onboard computing devices, onboard memory, etc.). This may be via a direct interface with the onboard systems of the vehicle or via a wireless interface (e.g. Bluetooth). If the application determines that the specific category of the vehicle is required to only travel in traffic lanes designated for traffic corresponding to such specific category, then the application can determine that the user request is associated with a traffic type corresponding to the specific category of vehicle. The application can send an API call that includes data indicative of the first transit area and the traffic type determined by the application to the server computing system. In response to the API call, the server computing system can determine map data indicative of traffic condition information associated with the traffic type for the first transit area and provide the map data to the application through the API. The application can provide the map data to the user via the user interface.

As another example, the application can obtain vehicle data indicative of a number of passengers in the vehicle. The vehicle data can include a state of one or more seat sensors or seatbelt sensors in the vehicle. If the application determines that only a single seat sensor or seatbelt sensor is activated, then the application can determine that the vehicle includes a single passenger. If the application determines that more than one seat sensor or seatbelt sensor is activated, then the application can determine that the vehicle includes more than one passengers and that the user request is associated with a traffic type corresponding to HOV traffic. The application can send an API call that includes data indicative of the first transit area and the traffic type determined by the application to the server computing system. In response to the API call, the server computing system can determine map data indicative of traffic condition information associated with the traffic type for the first transit area and provide the map data to the application through the API. The application can provide the map data to the user via the user interface.

As another example, the application can obtain vehicle data indicative of a toll payment device in the vehicle. The vehicle data can include a state of the toll payment device (e.g., active or inactive). If the application determines that the toll payment device is active, then the application can determine that the user request is associated with a traffic type corresponding to toll lane traffic. The application can send an API call that includes data indicative of the first transit area and the traffic type determined by the application to the server computing system. In response to the API call, the server computing system can determine map data indicative of traffic condition information associated with the traffic type for the first transit area and provide the map data to the application through the API. The application can provide the map data to the user via the user interface.

As another example, the application can obtain vehicle data indicative of a traffic lane that the vehicle is in. The application can obtain the vehicle data from, for example, one or more forward facing cameras. The application can determine whether the vehicle is in a left-most lane, middle lane, right-most lane, a certain number of lanes left/right of the left-most/right-most lane, etc., based on data acquired by the one or more forward facing cameras. The application may determine which traffic lane the vehicle is occupying through the application of one or more machine learning models (e.g. neural network(s)) to camera data. The application can send an API call that includes data indicative of the first transit area and the traffic lane determined by the application to the server computing system. In response to the API call, the server computing system can determine map data indicative of traffic condition information associated with the traffic lane (e.g., traffic condition information associated with traffic corresponding to a traffic type that is associated with the traffic lane) for the first transit area and provide the map data to the application through the API. The application can provide the map data to the user via the user interface.

The systems and methods described herein can provide a number of technical effects and benefits. For example, by enabling a server computing system to determine a plurality of traffic speeds associated with one or more traffic types for a transit area, the computing system can obtain useful data characterizing the state of a real-world physical system (that is, objects in transit on the road). From this data, the server computer system can provide traffic condition information for the transit area that corresponds to a traffic type of a user. A client computing system can transmit a request for traffic condition information that includes an indication of a traffic type, and receive traffic condition information corresponding to the indicated traffic type so that the client computing system can provide a user with traffic condition information that is more relevant to the user. In particular, if a transit area is associated with a plurality of traffic types travelling the same direction, e.g. to due to a plurality of traffic lanes, then an average traffic speed for the transit area can be misleading. For example, a transit area can include a normal traffic lane that is jammed, and an express traffic lane that is open. By determining the plurality of traffic speeds associated with one or more traffic types for the transit area, the traffic condition information that includes the plurality of traffic speeds can be more reliable than the average traffic speed. Thus, the information may enhance safety by providing users with more-reliable advance information of traffic conditions they may encounter (for example, at night).

Additionally, as noted above, the traffic condition information may be used for transit route planning, such as by an automated transit route proposal module for proposing a transit route between a specified first location and a specified second location. Improved route planning saves users time, and may result in reduced gas consumption and pollution. In one example, the present disclosure may provide a method and system for controlling an autonomous vehicle employing an automated transit route proposal module.

In addition to the above, the systems and methods described herein can determine a traffic type that is applicable to a request for traffic condition information. For instance, vehicle or user data can be obtained to determine the type of traffic condition information that applies to the request. This enables more accurate traffic condition information to be obtained.

Furthermore, a computing system employing the systems and methods described herein may reduce the transmission of less relevant information, thereby reducing bandwidth requirements.

With reference now to the Figures, example embodiments of the present disclosure will be discussed in further detail.

FIG. 1 depicts an example computing environment according to example embodiments of the present disclosure. Referring to FIG. 1, environment 100 can include client computing system 102, server computing system 106, and one or more networks 104 (e.g., one or more wired and/or wireless networks, and/or the like), which can interface systems 102 and 106.

System 102 can include one or more computing devices (e.g., computers (e.g., desktop computers, laptop computers, and/or the like), mobile computing devices (e.g., tablet computers, smartphones, and/or the like), wearable computing devices (e.g., smart watches, and/or the like), and/or the like) associated with a common (or the same) user. System 102 may be a navigation system built into a vehicle that may be directly connected to (or form part of) the vehicle's internal computing systems. System 102 can include one or more processors 108, one or more sensor(s) 110, one or more communication interfaces 112, and memory 114.

Sensor(s) 110 can include components (e.g., circuitry and/or the like) configured to determine and/or receive data indicating a geographic location of one or more computing devices of system 102 (e.g., a global positioning system (GPS) receiver, circuitry configured to determine a location based on signals, signal identifiers, signal strength, and/or the like received via communication interface(s) 112, and/or the like), data indicating a number of passengers (e.g., seat sensors, seatbelt sensors, and/or the like), and/or data indicating a traffic lane associated with one or more computing devices of system 102 (e.g., camera(s)).

Communication interface(s) 112 can include one or more interfaces (e.g., network interfaces, wired interfaces, wireless interfaces, and/or the like) configured to enable system 102 (e.g., one or more computing devices of system 102) to communicate (e.g., via network(s) 104, and/or the like) with one or more other computing devices of environment 100 (e.g., system 106, one or more computing devices of system 106, and/or the like).

Memory 114 can include instructions 116, which when executed by processor(s) 108 can cause system 102 (e.g., one or more computing devices of system 102) to perform one or more operations described herein. For example, memory 114 can include one or more applications 118 (e.g., application programs, and/or the like), application programming interface (API) 120, user data 132, and vehicle data 124. The user data 132 can include user preference information and/or contextual information indicative of a traffic type. The vehicle data 124 can include data indicative of a vehicle associated with a user request for traffic condition information, such as, for example, a vehicle make/model, vehicle weight, vehicle dimensions, or other information indicative of a specific category of the vehicle: a state of one or more seat sensors or seatbelt sensors in the vehicle: a state of a toll payment device associated with the vehicle: and/or a traffic lane that the vehicle is in.

In accordance with embodiments of the disclosure, API 120 can be configured to facilitate communication between application(s) 118 and the system 106 to obtain traffic condition information. In some embodiments, application(s) 118 can access user data 132 and retrieve user preference information and/or contextual information to determine a traffic type associated with a request for traffic condition information from a user in the instance where the user consents to the use of such data. In some embodiments, application(s) 118 can access vehicle data 134 to determine the traffic type associated with the request for traffic condition information from the user.

System 106 can be remotely located from system 102 (e.g., located at a geographic location remote from a geographic location at which system 102 is located). System 106 can include one or more computing devices (e.g., computers, servers, mainframes, virtual computing platforms, and/or the like). System 106 can include one or more processors 122, one or more communication interfaces 124, and memory 126. Communication interface(s) 124 can include one or more interfaces (e.g., network interfaces, wired interfaces, wireless interfaces, and/or the like) configured to enable system 106 (e.g., one or more computing devices of system 106) to communicate (e.g., via network(s) 104, and/or the like) with one or more other computing devices of environment 100 (e.g., system 102, one or more computing devices of system 102, and/or the like). Memory 126 can include instructions 128, which when executed by processor(s) 122 can cause system 106 (e.g., one or more computing devices of system 106) to perform one or more operations described herein. Memory 126 can also include (e.g., store, host, and/or the like) traffic sample data 130 indicative of traffic associated with a plurality of objects.

FIGS. 2A-2D depict an example event sequence according to example embodiments of the present disclosure.

Figure 2A:
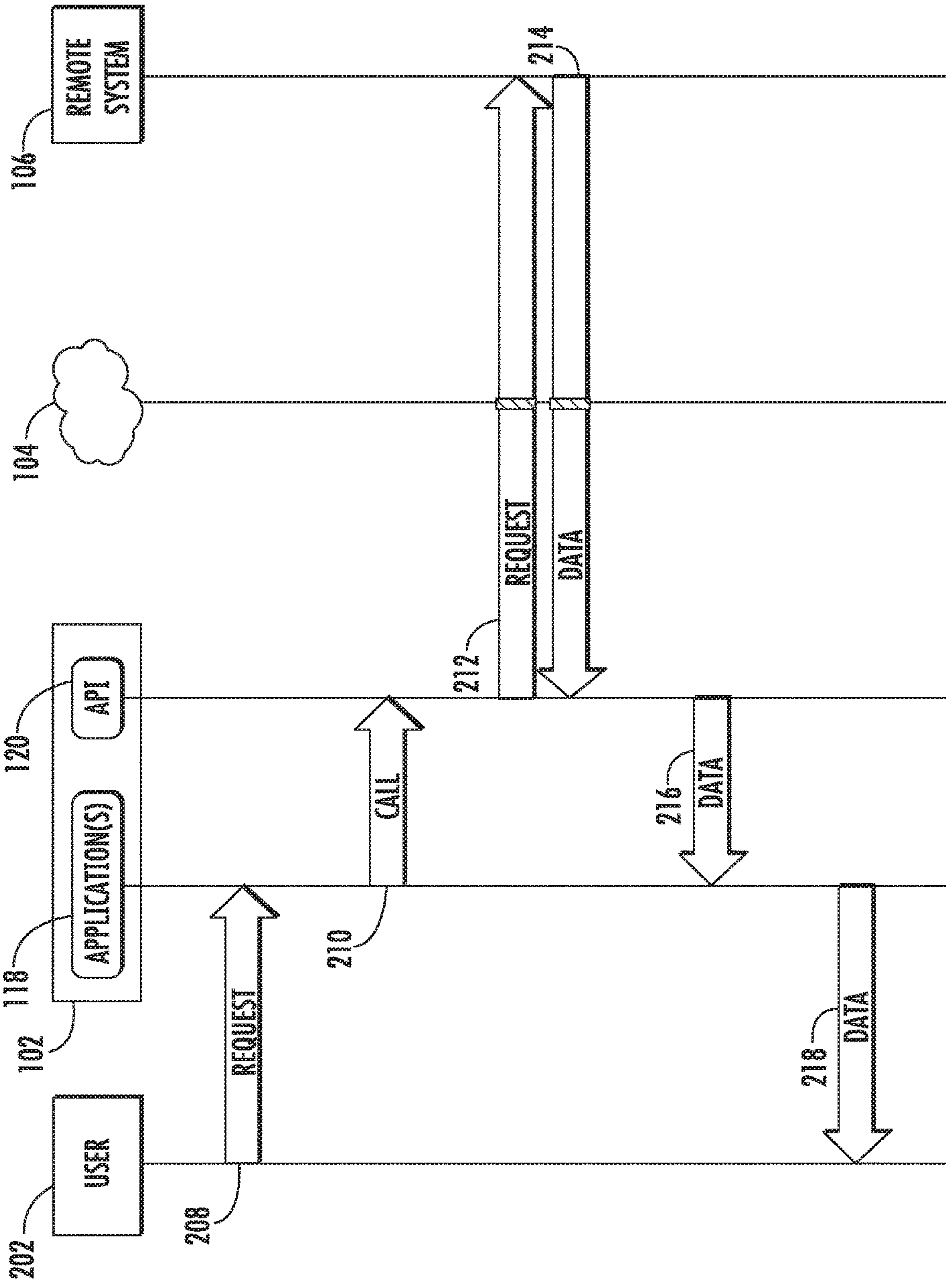
FIGS. 2A-2D depict example event sequences according to example embodiments of the present disclosure.

Referring to FIG. 2A, at (208), user 202 (e.g., a user associated with system 102) can request traffic condition information about a transit area from one or more applications 118 (e.g., an application executing on one or more computing devices of system 102). At (210), application(s) 118 can make a call (e.g., communicate data, and/or the like) using API 120 to request the traffic condition information about the transit area. For example, an API call can be issued from application(s) 118 to request the traffic condition information from remote system 106.

At (212), system 102 can communicate (e.g., via network (s) 104, as indicated by the cross-hatched box over the line extending downward from network(s) 104, and/or the like) a request for data to system 106 using API 120. For example, the request can be for traffic condition information about the transit area. System 106 can determine, for example, based on traffic sample data 130 (e.g., based on data indicative of a movement speed of one or more objects on one or more road segments within the transit area), the requested data (a portion thereof, and/or the like), and at (214), system 106 can communicate the requested data (the portion thereof, and/or the like) to system 102 using API 120, which can receive the requested data (the portion thereof, and/or the like) from system 106. For example, the data can include map data indicative of traffic condition information about the transit area.

At (216), the traffic condition information can be returned to the application(s) 118 (e.g., the application that made the call at (202)) using API 120.

At (218), the application(s) 118 can provide the traffic condition information to the user. For example, the application can display a map of the transit area and display one or more road segments in the transit area with a color, shading, or other visual characteristic that corresponds to a color-coded identifier associated with the road segment that is included in the map data.

In some implementations, at (208), user 202 can include an indication of a traffic type or a number of passengers with the request for traffic condition information about the transit area from the application(s) 118. In this case, at (210), the application(s) 118 can make a call (e.g., communicate data, and/or the like) using API 120 to request the traffic condition information about the transit area associated with the traffic type. An API call requesting the traffic condition information can be received from application(s) 118. At (212), system 102 can communicate a request to the system 106 for traffic condition information about the transit area associated with the traffic type. System 106 can determine the requested data and at (214), system 106 can communicate the requested data to system 102. At (216), the traffic condition information associated with the traffic type can be returned to the application(s) 118 using API 120. At (218), application(s) 118 can provide the traffic condition information to the user.

Figure 2B:
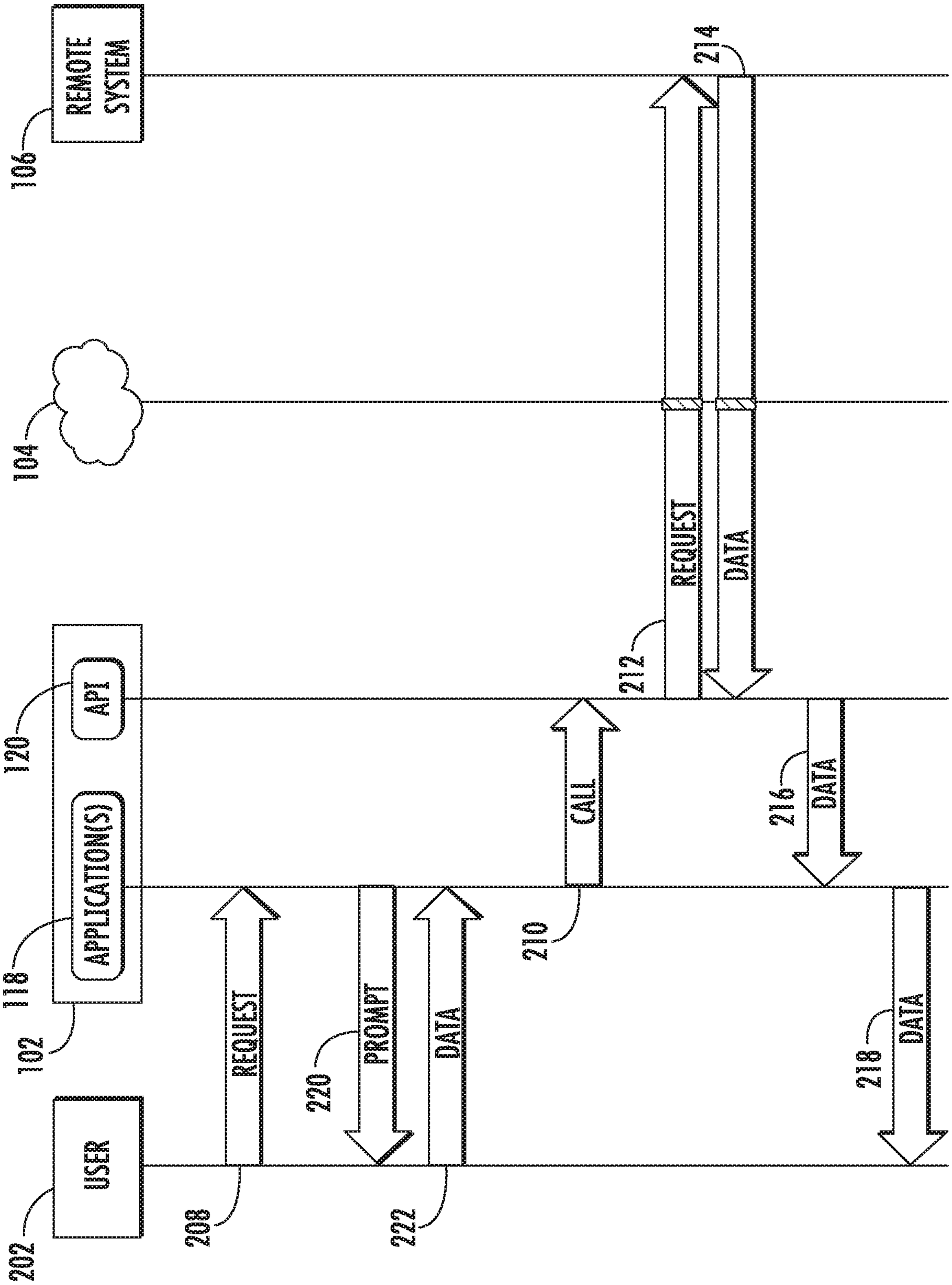

Referring to FIG. 2B, at (208), user 202 (e.g., a user associated with system 102) can request traffic condition information about a transit area from one or more application(s) 118 (e.g., an application executing on one or more computing devices of system 102). At (220), the application (s) 118 can prompt the user for a traffic type. The user 202 can provide data indicative of a traffic type to the application (s) 118. For example, user 202 can select one or more traffic types from a predetermined list of traffic types via a user interface of the application(s) 118, user 202 can indicate whether the requested traffic condition information is for a single passenger or a plurality of passengers, and/or user 202 can indicate a specific category of a vehicle associated with the request. The application(s) 118 can determine the traffic type based on the data provided by user 202 in response to the prompt. For example, if user 202 selects a first traffic type, then the application(s) 118 can determine the traffic type as the first traffic type. As another example, if user 202 provides an indication of a number of passengers, then the application(s) 118 can determine the traffic type that corresponds to the number of passengers.

At (210), the application(s) 118 can make a call (e.g., communicate data, and/or the like) using API 120 to request the traffic condition information about the transit area associated with the traffic type. For example, an API call can be issued from application(s) 118 to request the traffic condition information from remote system 106.

At (212), system 102 can communicate (e.g., via network (s) 104, as indicated by the cross-hatched box over the line extending downward from network(s) 104, and/or the like) a request for data to system 106 using API 120. For example, the request can be for traffic condition information about the transit area associated with the traffic type. System 106 can determine, for example, based on traffic sample data 130 (e.g., based on data indicative of a movement speed of one or more objects on one or more road segments within the transit area), the requested data (a portion thereof, and/or the like), and at (214), system 106 can communicate the requested data (the portion thereof, and/or the like) to system 102 using API 120, which can receive the requested data (the portion thereof, and/or the like) from system 106. For example, the data can include map data indicative of traffic condition information about the transit area associated with the traffic type.

At (216), the traffic condition information can be returned to the application(s) 118 (e.g., the application that made the call at (202)) using API 120.

At (218), the application(s) 118 can provide the traffic condition information to the user. For example, the application can display a map of the transit area and display one or more road segments in the transit area with a color, shading, or other visual characteristic that corresponds to a color-coded identifier associated with the road segment that is included in the map data.

Figure 2C:
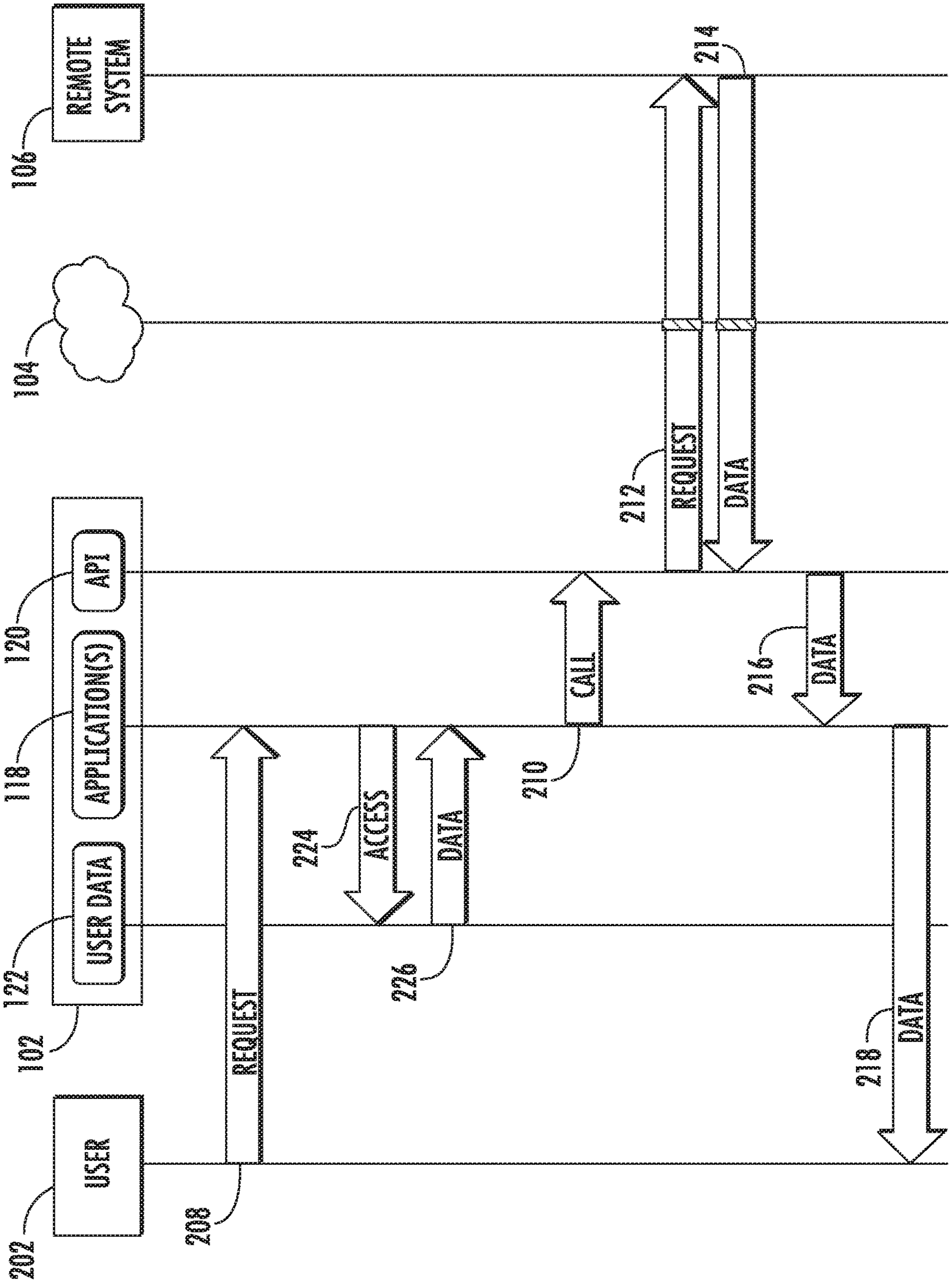

Referring to FIG. 2C, at (208), user 202 (e.g., a user associated with system 102) can request traffic condition information about a transit area from an application(s) 118 (e.g., an application executing on one or more computing devices of system 102). At (224), the application(s) 118 can access user data 132 in memory 114 to determine a traffic type corresponding to the request for traffic condition information about the transit area. At (226), the application(s) 118 can retrieve data indicative of the traffic type from the user data 132.

Figure 2D:
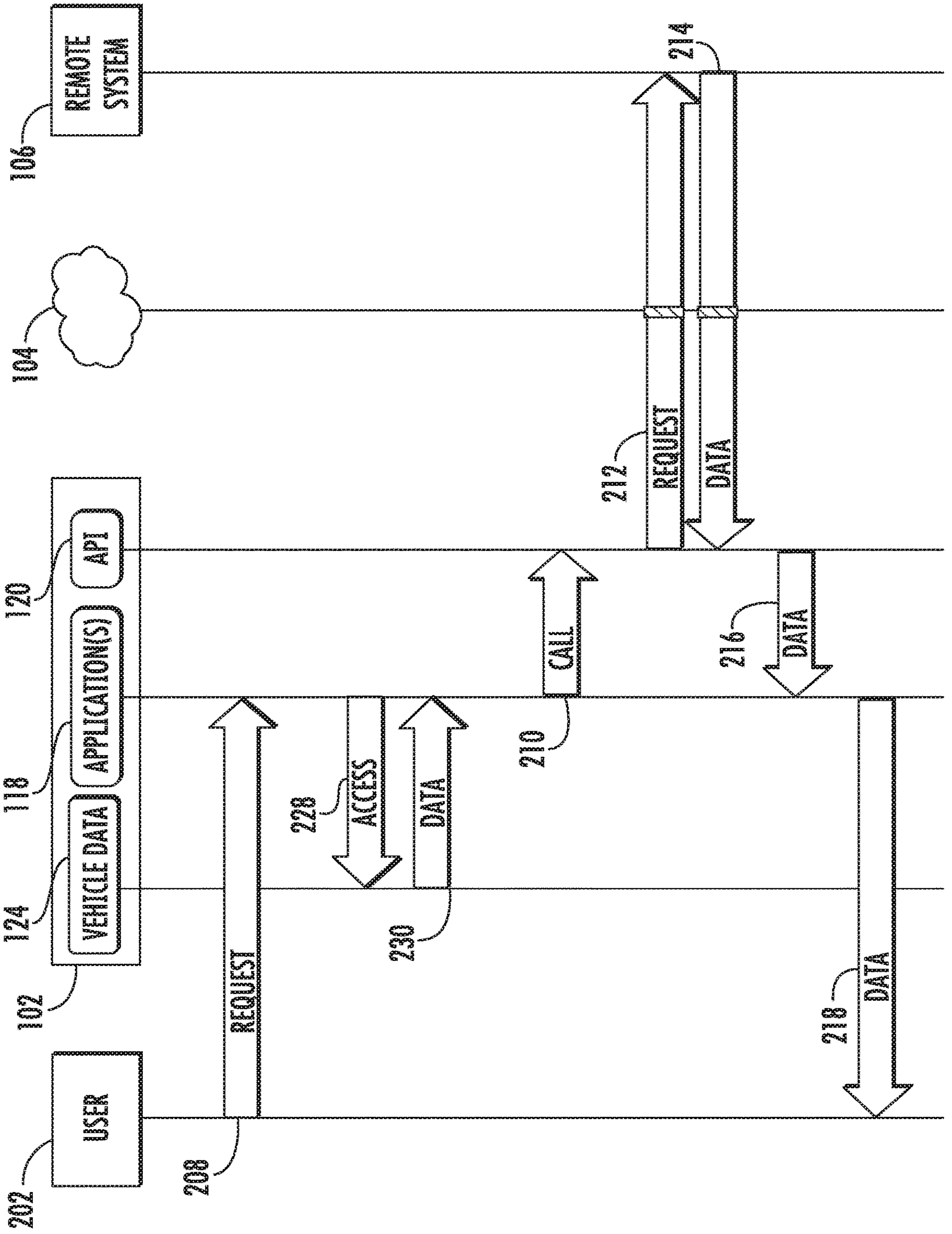

Referring to FIG. 2D, at (208), user 202 (e.g., a user associated with system 102) can request traffic condition information about a transit area from an application(s) 118 (e.g., an application executing on one or more computing devices of system 102). At (228), the application(s) 118 can access vehicle data 134 in memory 114 to determine a traffic type corresponding to the request for traffic condition information about the transit area. At (230), the application(s) 118 can retrieve data indicative of the traffic type from the vehicle data 134.

Figure 3A:
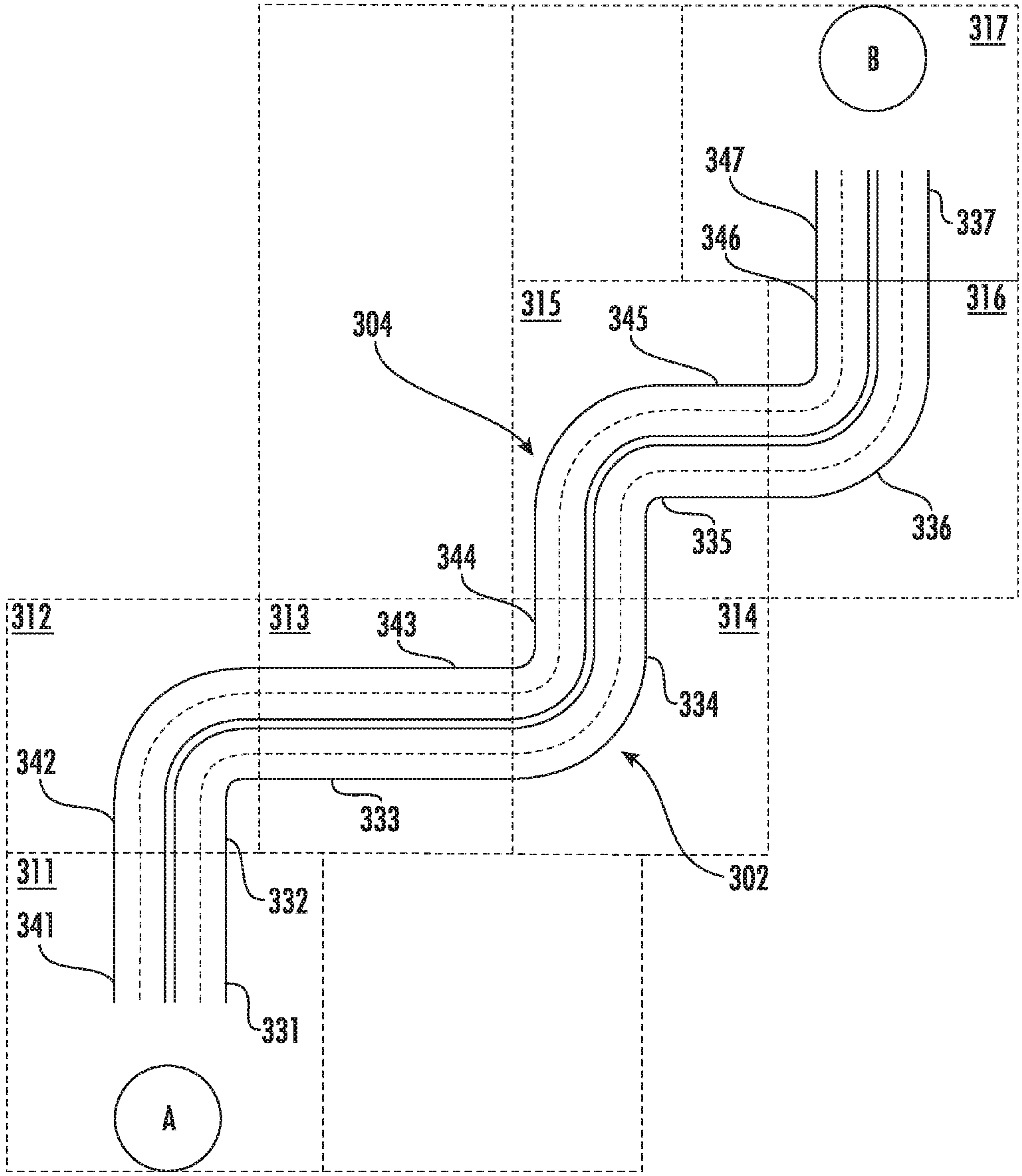
FIGS. 3A-3C depict a visualization of traffic condition information according to example embodiments of the present disclosure.
Figure 3B:
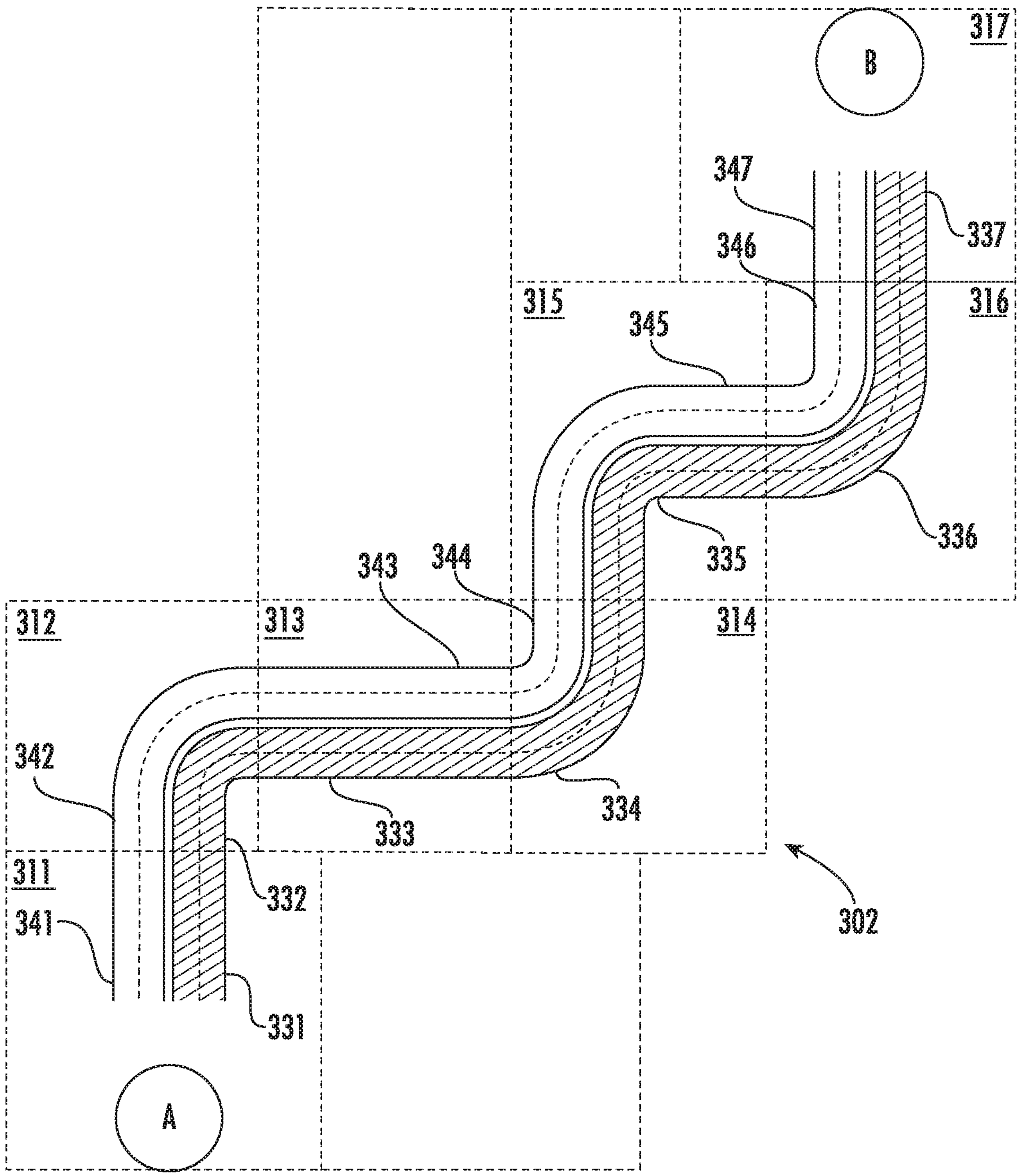
Figure 3C:
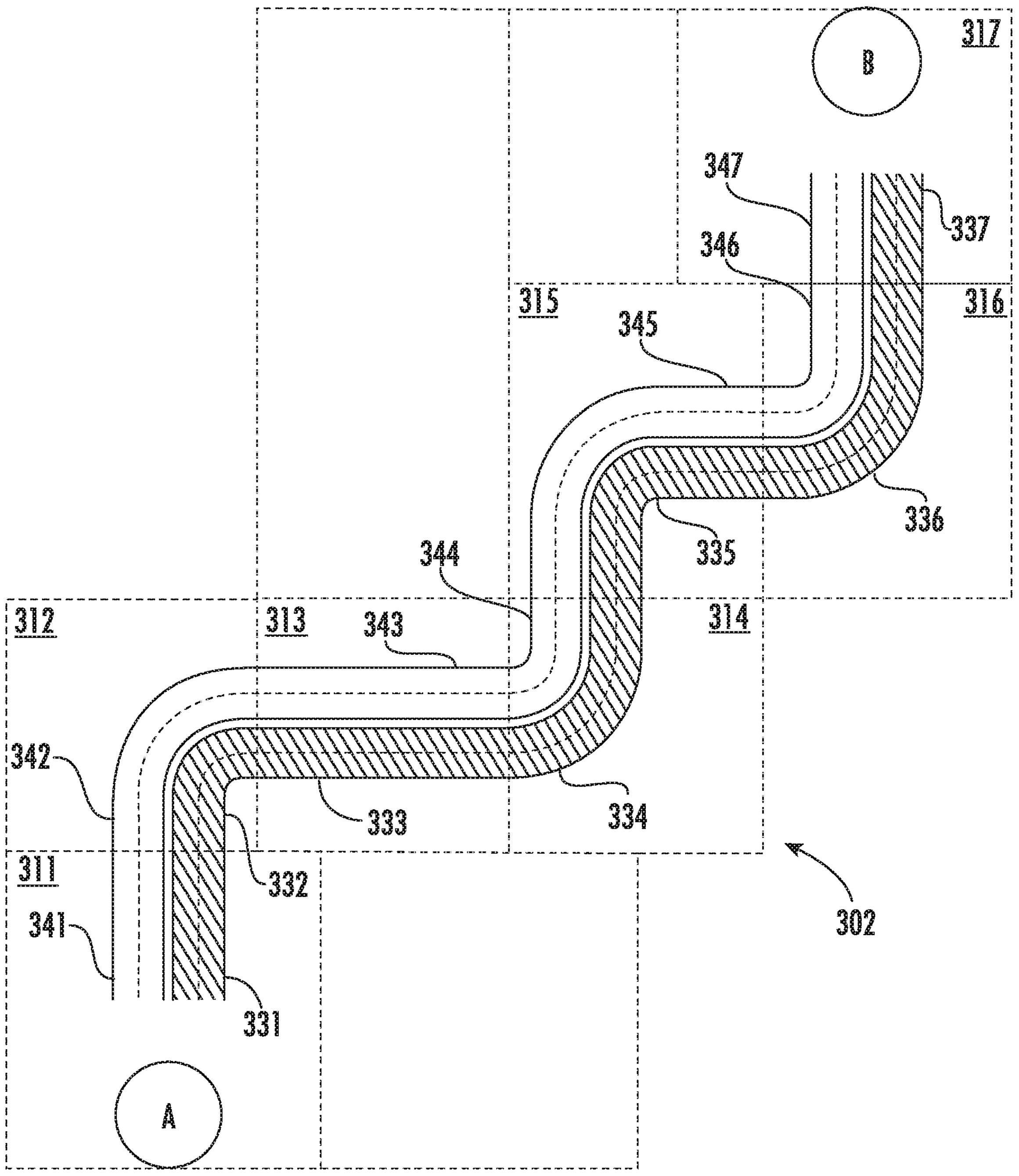

FIGS. 3A-3C depict a visualization of traffic condition information according to example embodiments of the present disclosure. Referring to FIG. 3A, a transit route 302 from location A to location B, and a transit route 304 from location B to location A. The transit routes 302 and 304 each can include a plurality of transit areas 311, 312, 313, 314, 315, 316, and 317. Each of the transit areas 311, 312, 313, 314, 315, 316, and 317 can include one or more road segments. For example, transit area 311 includes road segments 331 and 341: transit area 312 includes road segments 332, and 342: transit area 313 includes road segments 333, and 343: transit area 314 includes road segments 334, and 344; transit area 315 includes road segments 335, and 345: and transit area 316 includes road segments 336, and 346.

According to an example embodiment of the present disclosure, the transit route 302 can be associated with a first traffic speed corresponding to a first traffic type, and a second traffic speed corresponding to a second traffic type. For instance, the first traffic speed can be greater than a speed limit associated with the transit route 302, and the second traffic speed can be less than the speed limit associated with the transit route 302.

As shown in FIG. 3B, if a user requests traffic condition information about transit route 302 associated with the first traffic type, then the system 106 can determine map data indicative of the first traffic speed associated with first traffic type. The map data indicative of the first traffic speed can include a first color-coded identifier (shown as light grey) associated with each road segment of the transit route 302.

As shown in FIG. 3C, if a user requests traffic condition information about transit route 302 associated with the second traffic type, then the system 106 can determine map data indicative of the second traffic speed associated with the second traffic type. The map data indicative of the second traffic speed can include a second color-coded identifier (shown as dark grey) associated with each road segment of the transit route 302.

Figure 4A:
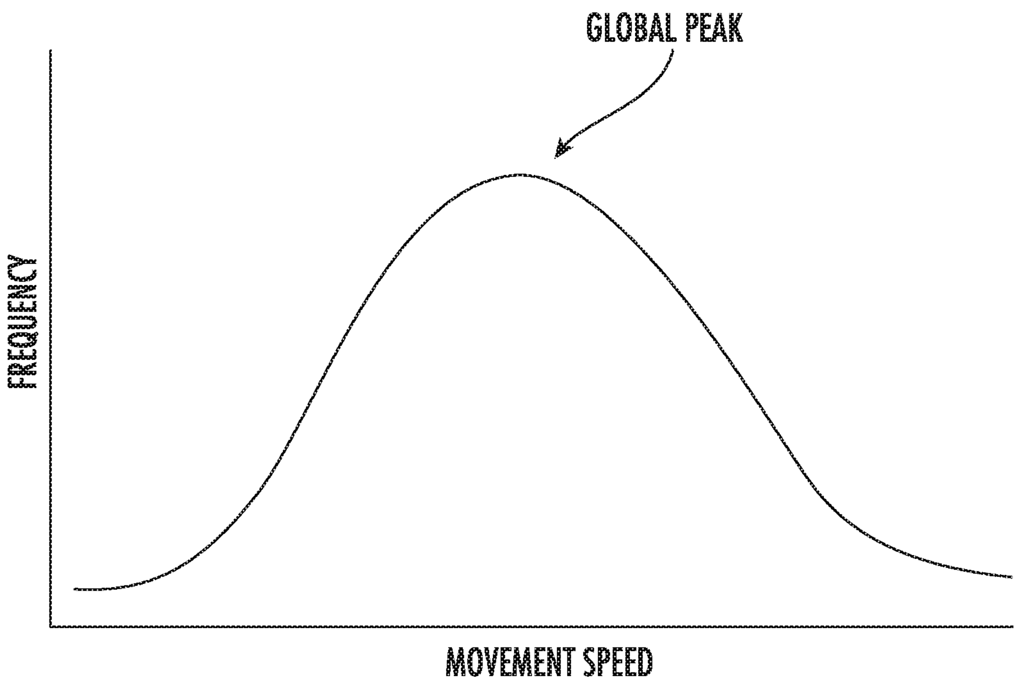
FIGS. 4A-4B depict an example distribution of movement speeds on a road segment according to example embodiments of the present disclosure.
Figure 4B:
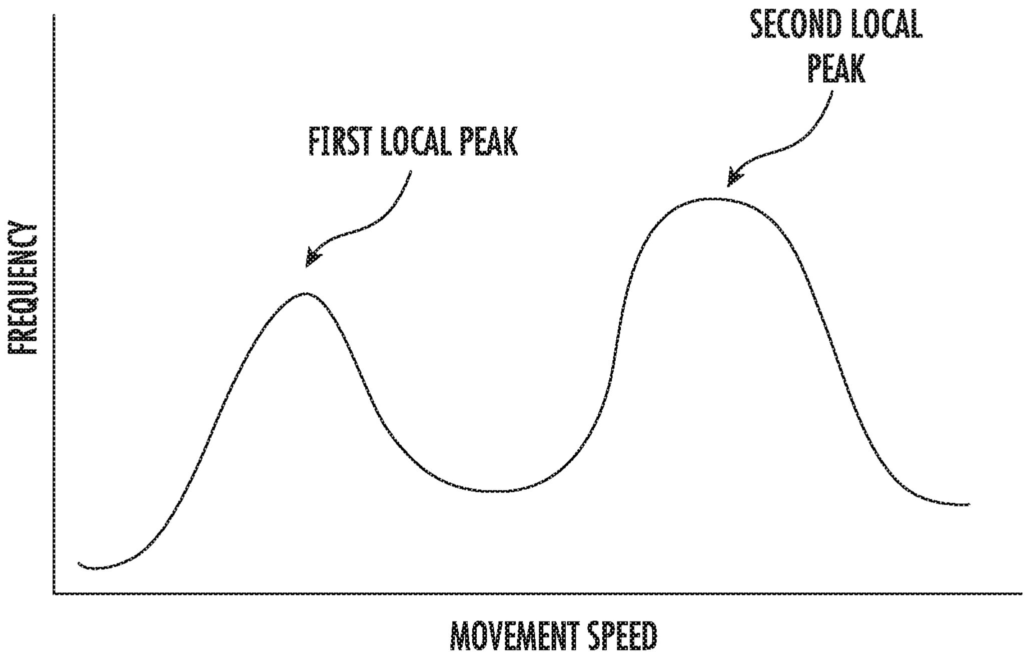

FIGS. 4A-4B depict an example distribution of movement speeds on a road segment according to example embodiments of the present disclosure. The distribution of movement speeds on a road segment can be based on traffic sample data 130 indicative of a plurality of movement speeds associated with a plurality of objects (e.g., vehicles, pedestrians, etc.) on the road segment. The system 106 can obtain traffic sample data 130 from one or more data sources, such as, for example, observations supplied by humans, a network of traffic sensors, and/or one or more mobile data sources associated with one or more objects from the plurality of objects (e.g., a smartphone on a person or in a vehicle). The traffic sample data 130 can include at least a position at a first time and a position at a second time of the plurality of objects on the road segment. The system 106 can determine a movement speed associated with each of the plurality of objects based on the traffic sample data. Alternatively, system 106 can obtain traffic sample data 130 that includes the plurality of movement speeds associated with the plurality of objects.

As shown in FIG. 4A, the distribution of the movement speeds on a first road segment can include a single global peak and the geographic information service can determine that the first road segment is associated with a single traffic speed based on the distribution. The geographic information service can associate a traffic type with the single traffic speed (e.g., normal traffic) and associate the road segment with the traffic type.

As shown in FIG. 4B, the distribution of movement speeds on a first road segment can include a first local peak and a second local peak. The geographic information service can determine that the first road segment is associated with a first traffic speed corresponding to the first local peak and a second traffic speed corresponding to the second local peak, based on the distribution. The geographic information service can associate a first traffic type with the first traffic speed and associate a second traffic type with the second traffic speed.

Figure 5:
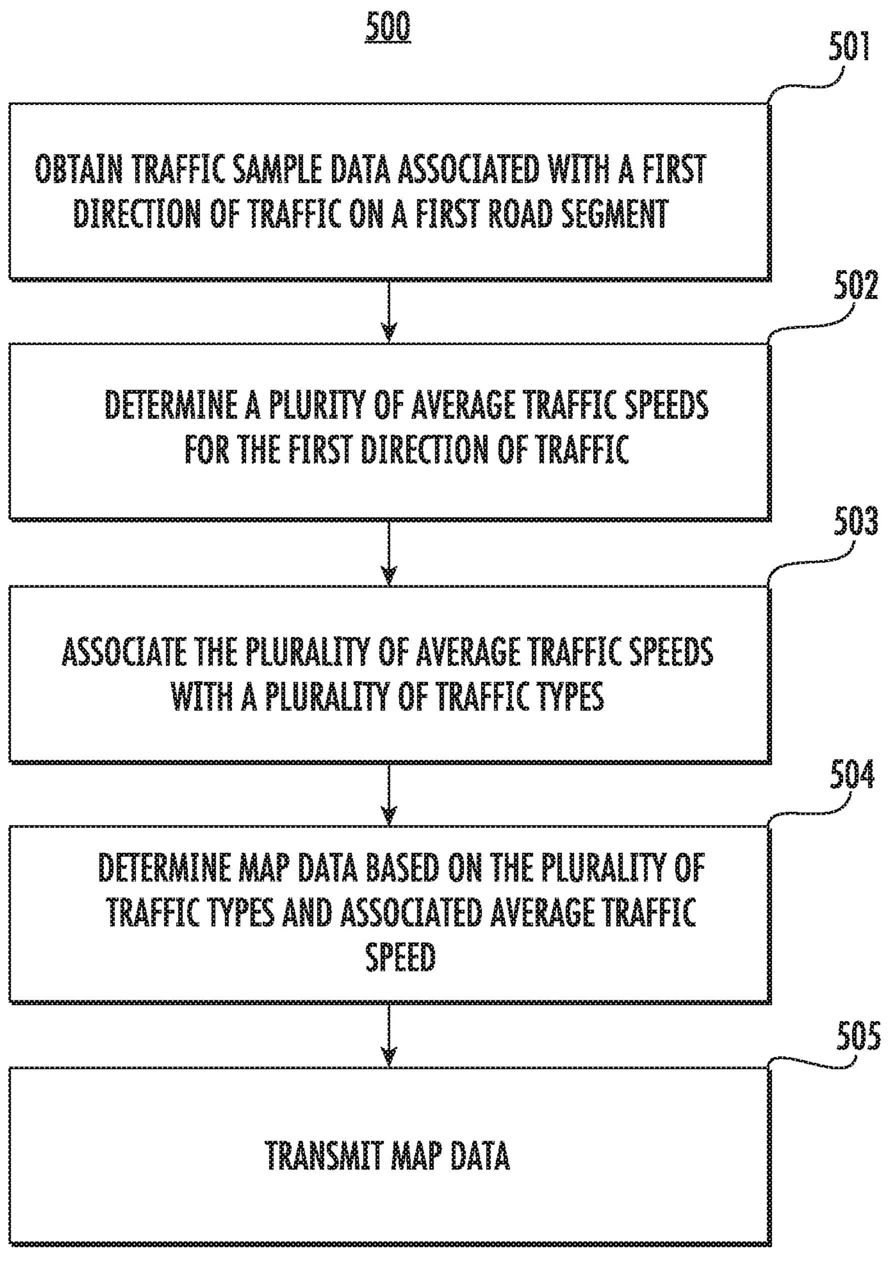
FIG. 5 depicts a flow diagram for determining traffic condition information according to example embodiments of the present disclosure.

FIG. 5 depicts a flow diagram of a method 500 for determining traffic condition information according to example embodiments of the present disclosure. At (501), the method 500 can include obtaining traffic sample data associated with a first direction of traffic on a first road segment. For example, the system 106 can obtain traffic sample data 130 associated with a first direction of traffic on a first road segment. The traffic sample data 130 can include data indicative of a plurality of movement speeds associated with a plurality of objects.

At (502), the method 500 can include determining a plurality of average traffic speeds for the first direction of traffic. For example, the system 106 can determine a plurality of average traffic speeds for the first direction of traffic on the first road segment based at least in part on the plurality of movement speeds in the traffic sample data 130. Each of the plurality of average traffic speeds can be associated with one or more lanes of the first road segment. In particular, the system 106 can determine a distribution of the plurality of movement speeds and identify a plurality of peaks based on the distribution of the plurality of movement speeds. Each peak from the plurality of peaks can be associated with a subset of the plurality of movement speeds. The system 106 can identify a first peak from the plurality of peaks based at least in part on a first cluster of the plurality of movement speeds distributed around the first peak, and identify a second peak from the plurality of peaks based at least in part on a second cluster of the plurality of movement speeds distributed around the second peak. The subset of the plurality of movement speeds associated with the first peak can correspond to the first cluster, and the subset of the plurality of movement speeds associated with the second peak can correspond to the second cluster. The system 106 can determine an average traffic speed for each peak from the plurality of peaks based at least in part on an average of the subset of movement speeds associated with the peak. The system 106 can associate the average traffic speed for each peak from the plurality of peaks with a different traffic type from the plurality of traffic types.

At (503), the method 500 can include associating the plurality of average traffic speeds with a plurality of average traffic types. For example, the system 106 can associate each of the plurality of average traffic speeds with at least one of a plurality of traffic types. In particular, the system 106 can associate an average traffic speed from the plurality of average traffic speeds with a traffic type from the plurality of traffic types, based at least in part on a value of the average traffic speed relative to the plurality of average traffic speeds. The system 106 can associate an average traffic speed with a lowest value from the plurality of average traffic speeds with a first traffic type from the plurality of traffic types, and associate an average traffic speed with a highest value from the plurality of average traffic speeds with a second traffic type from the plurality of traffic types.

At (504), the method 500 can include determining map data based on the plurality of traffic types and associated average traffic speed. For example, the system 106 can determine map data based at least in part on the plurality of traffic types and associated average traffic speeds.

At (505), the method 500 can include transmitting map data. For example, the system 106 can transmit map data corresponding to at least one of the plurality of traffic types to the system 102, in response to a request. In particular, the system 106 can transmit a plurality of routing or navigation options including at least a first routing option corresponding to a first average speed associated with a first traffic type and a second routing option corresponding to a second average speed associated with a second traffic type. In some implementations, the request can include a first traffic type, and the map data can correspond to the first traffic type. The map data can correspond to two or more of the plurality of traffic types, and the map data can include a comparison between the first traffic type and at least a second traffic type from the plurality of traffic types. In some implementations, the request is a routing request, and the transmitted map data can include first routing data based on a first average speed and second routing data based on a second average speed.

Figure 6:
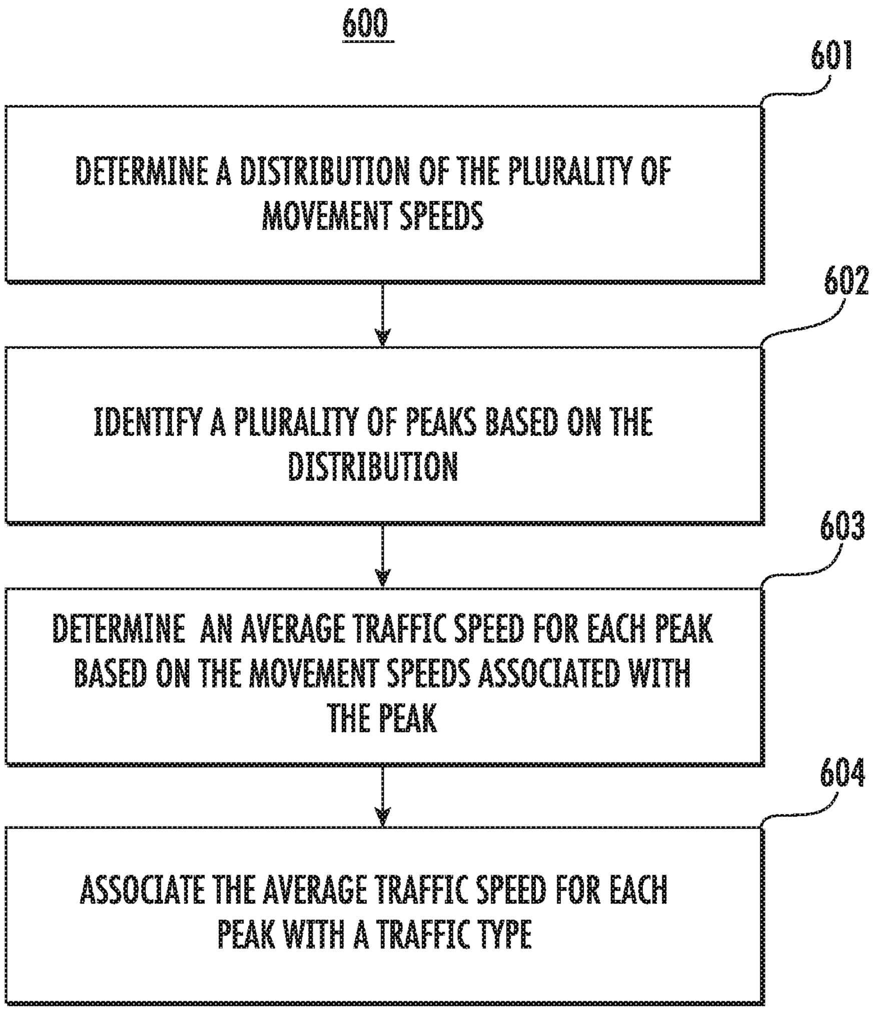
FIG. 6 depicts a flow diagram for associating a plurality of traffic speeds with a traffic type according to example embodiments of the present disclosure.

FIG. 6 depicts an example flow diagram of a method 600 for associating a plurality of traffic speeds with a traffic type according to example embodiments of the present disclosure. At (601), the method 600 can include determining a distribution of the plurality of movement speeds. For example, the system 106 can determine a distribution of the plurality of movement speeds based on traffic sample data 130.

At (602), the method 600 can include identifying a plurality of peaks based on the distribution. For example, the system 106 can identify a plurality of peaks based on the distribution of the plurality of movement speeds. Each peak from the plurality of peaks can be associated with a subset of the plurality of movement speeds. The system 106 can identify a first peak from the plurality of peaks based at least in part on a first cluster of the plurality of movement speeds distributed around the first peak, and identify a second peak from the plurality of peaks based at least in part on a second cluster of the plurality of movement speeds distributed around the second peak. The subset of the plurality of movement speeds associated with the first peak can correspond to the first cluster, and the subset of the plurality of movement speeds associated with the second peak can correspond to the second cluster.

At (603), the method 600 can include determining an average traffic speed for each peak based on the movement speeds associated with the peak. For example, the system 106 can determine an average traffic speed for each peak from the plurality of peaks based at least in part on an average of the subset of movement speeds associated with the peak.

At (604), the method 600 can include associating the average traffic speed for each peak with a traffic type. For example, the system 106 can associate the average traffic speed for each peak from the plurality of peaks with a different traffic type from the plurality of traffic types.

Figure 7:
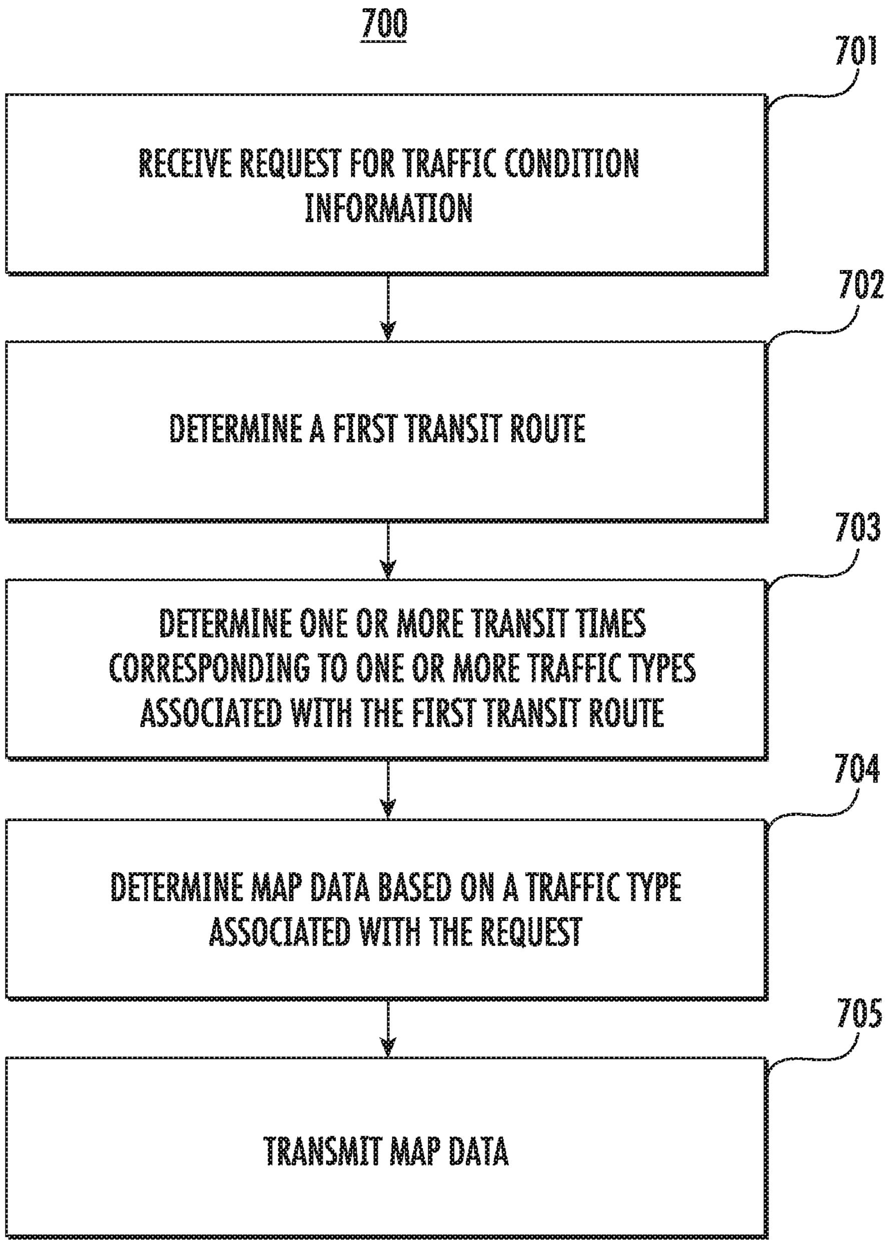
FIG. 7 depicts a flow diagram for determining traffic condition information according to example embodiments of the present disclosure.

FIG. 7 depicts an example flow diagram of a method 700 for determining traffic condition information according to example embodiments of the present disclosure. At (701), the method 700 can include receiving a request for traffic condition information. For example, application(s) 118 can receive one or more requests for traffic condition information from user 202. The one or more requests from user 202 can include data indicative of a first location, a second location, and a traffic type. The application can provide the request to the system 106 via the API 120.

At (702), the method 700 can include determining a first transit route. For example, the system 106 can determine a first transit route from the first location to the second location. The first transit route can include one or more transit areas associated with a first traffic type from a plurality of traffic types.

At (703), the method 700 can include determining one or more transit times corresponding to one or more traffic types associated with the first transit route. For example, the system 106 can identify a first transit area of the first transit route that is associated with two or more traffic types from the plurality of traffic types. The two or more traffic types can include the first traffic type and the second traffic type from the plurality of traffic types. The system 106 can determine a first transit time for the first transit route that corresponds to a traffic speed associated with the first traffic type. In particular, the system 106 can determine a traffic speed for each of the one or more transit areas based at least in part on an average traffic speed associated with the first traffic type for the transit area. The system 106 can determine the first transit time for the first transit route based at least in part on the average traffic speed for each of the one or more transit areas. In some implementations, the system 106 can determine a second transit time for the first transit route that corresponds to a traffic speed associated with the second traffic type from the plurality of traffic types.

At (704), the method 700 can include determining map data based on a traffic type associated with the request. For example, the system 106 can associate the first traffic type with user 202 based at least in part on the data indicative of the traffic type received from user 202, and determine map data indicative of the first transit time for the first transit route. In particular, the system 106 can obtain data indicative of a speed limit for each of the one or more transit areas, associate a color-coded identifier for each of the one or more transit areas based on the difference, and determine the map data based on the color-coded identifier associated with each of the one or more transit areas. In some implementations, the system 106 can determine map data indicative of the second transit time for the first transit route if the second transit time is less than the first transit time.

At (705), the method 700 can include transmitting the map data. For example, the system 106 can provide the map data to the application(s) 118 via the API 120 in response to the request for traffic condition information.

Figure 8:
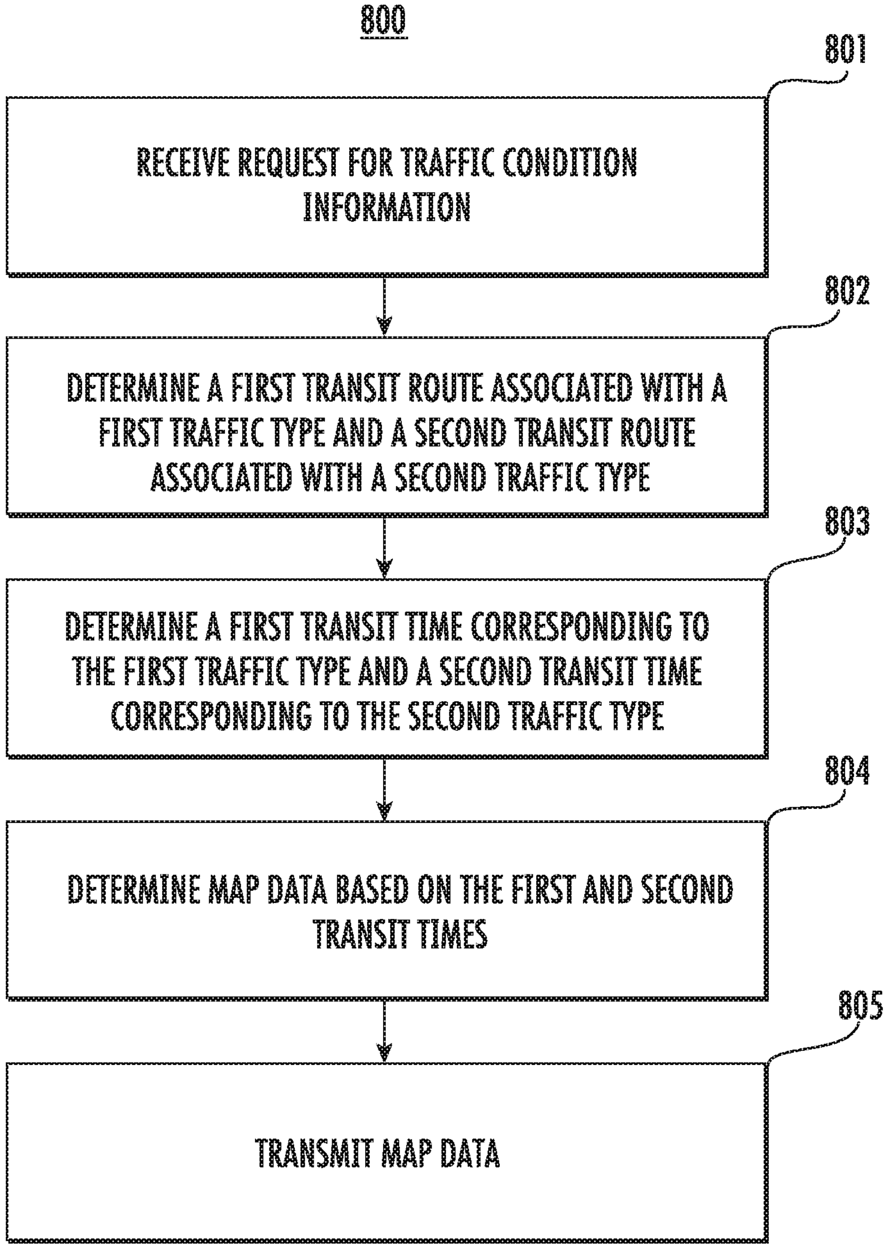
FIG. 8 depicts a flow diagram for determining traffic condition information according to example embodiments of the present disclosure.

FIG. 8 depicts an example flow diagram of a method 800 for determining traffic condition information according to example embodiments of the present disclosure. At (801), the method 800 can include receiving a request for traffic condition information. For example, application(s) 118 can receive one or more requests for traffic condition information from user 202. The one or more requests from user 202 can include data indicative of a first location, a second location, and a traffic type. The application can provide the request to the system 106 via the API 120. In some implementations, the system 106 can provide a prompt for user 202 to select a traffic type, and receive the data indicative of the traffic type from user 202 in response to the prompt.

At (802), the method 800 can include determining a first transit route associated with a first traffic type and a second transit route associated with a second traffic type. For example, the system 106 can determine a first transit route from the first location to the second location. The first transit route can include one or more transit areas associated with a first traffic type from a plurality of traffic types. The system 106 can also determine a second transit route from the first location to the second location. The second transit route can include at least one transit area associated with a second traffic type from a plurality of traffic types. In some implementations, the first transit route and the second transit route can both include a first transit area that is associated with two or more traffic types from the plurality of traffic types. The two or more traffic types including the first traffic type and the second traffic type.

At (803), the method 800 can include determining a first transit time corresponding to the first traffic type and a second transit time corresponding to the second traffic type. For example, the system 106 can determine a first transit time for the first transit route that corresponds to a traffic speed associated with the first traffic type. The system 106 can also determine a second transit time for the second transit route that corresponds to a traffic speed associated with the second traffic type.

At (804), the method 800 can include determining map data based on the first and second transit times. For example, the system 106 can associate the first traffic type from the plurality of traffic types with user 202, based at least in part on the first transit time and the second transit time. In particular, the system 106 can associate the first transit type with user 202 if the first transit time is less than the second transit time. Alternatively, the system 106 can associate the second traffic type from the plurality of traffic types with user 202 if the second transit time is less than the first transit time.

At (805), the method 800 can include transmitting the map data. For example, the system 106 can provide the map data to the application(s) 118 via the API 120 in response to the request for traffic condition information.

Figure 9:
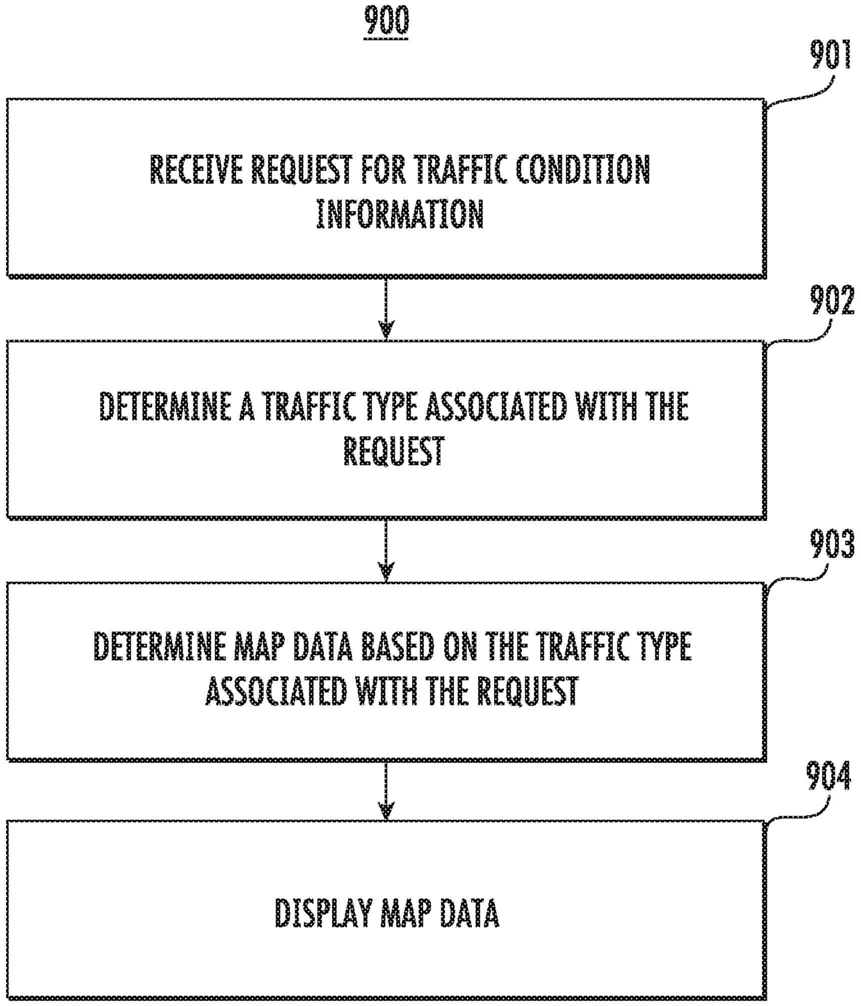
FIG. 9 depicts a flow diagram for displaying traffic condition information according to example embodiments of the present disclosure.

FIG. 9 depicts an example flow diagram of a method 900 for displaying traffic condition information according to example embodiments of the present disclosure. At (901), the method 900 can include requesting traffic condition information. For example, application(s) 118 can receive a request for traffic condition information from user 202. The request can include data indicative of one or more road segments (e.g., a transit route, a transit area, etc.). In some implementations, the request can include a traffic type associated with the request that is provided by the user (e.g., data indicative of a selected traffic type, number of passengers, certain category of vehicle, etc.).

At (902), the method 900 can include determining a traffic type associated with the request if the request does not include data indicative of the traffic type. For example, in some implementations application(s) 118 can provide a prompt for user 202 to select a traffic type, a number of passengers, and/or a certain category of vehicle. Application (s) 118 can receive data indicative of the traffic type from user 202 in response to the prompt. In some implementations, application(s) 118 can retrieve user data 132 and/or vehicle data 134 to determine the traffic type associated with the request (e.g. from computing systems such as sensors and memory built into the vehicle). User data 132 can include one or more preferences associated with user 202 and/or contextual information associated with user 202. Vehicle data 134 can include a vehicle make/model, vehicle weight, vehicle dimensions, vehicle type (e.g. truck, car, etc.), vehicle engine type (e.g. electric, petrol, diesel, etc.), vehicle emissions data, or other information indicative of a specific category of a vehicle associated with the request: a state of one or more seat sensors or seatbelt sensors in the vehicle: a state of a toll payment device: and/or data indicative of a traffic lane that the vehicle is in. Application(s) 118 can determine the traffic type associated with the request based on user data 132 and/or vehicle data 134. In some implementations, application(s) 118 can provide user data 132 and/or vehicle data 134 (or a portion thereof) to system 106 via API 120 to determine the traffic type associated with the request. For example, application(s) 118 can provide data indicative of a traffic lane of the vehicle to system 106 via API 120, and system 106 can determine a traffic type associated with the traffic lane based on road segment attribute data indicative of a traffic type associated with the traffic lane.

At (903), the method 900 can include determining map data based on the traffic type associated with the request. For example, application(s) 118 can request traffic condition information for the road segment(s) from system 106 via API 120. Application(s) 118 can provide data indicative of the determined traffic type associated with the request to system 106. In some implementations, application(s) 118 can provide user data 132 and/or vehicle data 134 (or a portion thereof) to system 106 via API 120, as described above. System 106 can determine map data indicative of traffic condition information for the road segment(s) corresponding to the traffic type associated with the request (e.g., traffic speed and/or transit time associated with traffic corresponding to the traffic type on the road segment(s)). The map data can include a color-coded identifier associated with each road segment from a plurality of road segments. System 106 can provide the determined map data to application(s) 118.

At (904), the method 900 can include displaying the map data. For example, application(s) 118 can display a graphical user interface that includes a map of the road segment(s). The segments can be displayed based on the color-coded identifier associated with each road segment from the plurality of road segments.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described: the numbering of depicted steps is merely for ease of reference and does not imply any particular ordering is necessary or preferred. The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible. While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

Further to the descriptions above, a user may be provided with controls allowing the user to make an election as to both if and when systems, applications or features described herein may enable collection of user information (e.g., a user's preferences, a user's current location, contextual information about a user's social network, social actions, activities, or profession), and if the user is sent content or communications from a server based on the user information. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A computer-implemented method for determining traffic conditions, the method comprising:

obtaining, by one or more computing devices, traffic sample data associated with a first direction of traffic on a first road segment, the traffic sample data including data indicative of a plurality of movement speeds associated with a plurality of objects, determining, by the one or more computing devices, a plurality of average traffic speeds for the first direction of traffic on the first road segment based at least in part on the plurality of movement speeds, associating, by the one or more computing devices, each of the plurality of average traffic speeds with at least one of a plurality of traffic types, a first average traffic speed among the plurality of average traffic speeds corresponding to a first traffic type among the plurality of traffic types and a second average traffic speed among the plurality of average traffic speeds corresponding to a second traffic type among the plurality of traffic types;

determining, by the one or more computing devices, map data based at least in part on the plurality of traffic types and associated average traffic speeds; and in response to receiving a request, transmitting, by the one or more computing devices to a client device, map data corresponding to at least one of the plurality of traffic types for presentation, via a user interface of the client device, to a user associated with the client device.

2. The computer-implemented method of claim 1, wherein determining the plurality of average traffic speeds for the first direction of traffic on the first road segment based at least in part on the plurality of movement speeds comprises:

determining, by the one or more computing devices, a distribution of the plurality of movement speeds;

identifying, by the one or more computing devices, a plurality of peaks based on the distribution of the plurality of movement speeds, each peak from the plurality of peaks associated with a subset of the plurality of movement speeds; and determining, by the one or more computing devices, an average traffic speed for each peak from the plurality of peaks based at least in part on an average of the subset of movement speeds associated with the peak.

3. The computer-implemented method of claim 2, wherein identifying the plurality of peaks based on the distribution of the plurality of movement speeds, each peak from the plurality of peaks associated with a subset of the plurality of movement speeds, comprises:

identifying, by the one or more computing devices, a first peak from the plurality of peaks based at least in part on a first cluster of the plurality of movement speeds distributed around the first peak, the subset of the plurality of movement speeds associated with the first peak corresponding to the first cluster; and identifying, by the one or more computing devices, a second peak from the plurality of peaks based at least in part on a second cluster of the plurality of movement speeds distributed around the second peak, the subset of the plurality of movement speeds associated with the second peak corresponding to the second cluster.

4. The computer-implemented method of claim 2, the method further comprising:

associating, by the one or more computing devices, the average traffic speed for each peak from the plurality of peaks with a different traffic type from the plurality of traffic types.

5. The computer-implemented method of claim 1, wherein associating each of the plurality of average traffic speeds with the at least one of the plurality of traffic types comprises:

associating, by the one or more computing devices, an average traffic speed from the plurality of average traffic speeds with a traffic type from the plurality of traffic types, based at least in part on a value of the average traffic speed relative to the plurality of average traffic speeds.

6. The computer-implemented method of claim 1, wherein associating each of the plurality of average traffic speeds with the at least one of the plurality of traffic types comprises:

associating, by the one or more computing devices, an average traffic speed with a lowest value from the plurality of average traffic speeds with the first traffic type from the plurality of traffic types; and associating, by the one or more computing devices, an average traffic speed with a highest value from the plurality of average traffic speeds with the second traffic type from the plurality of traffic types.

7. The computer-implemented method of claim 1, wherein the traffic sample data includes data indicative of a traffic type associated with the plurality of objects, and determining, the plurality of average traffic speeds for the first direction of traffic on the first road segment based at least in part on the plurality of movement speeds associated with the plurality of objects comprises:

determining, by the one or more computing devices, a first set of objects and a second set of objects from the plurality of objects, each object in the first set associated with the first traffic type and each object in the second set associated with the second traffic type; and determining, by the one or more computing devices, the first average traffic speed based on a movement speed associated with each object in the first set of objects, and the second average traffic speed based on a movement speed associated with each object in the second set of objects.

8. The computer-implemented method of claim 1, further comprising:

associating, by the one or more computing devices, the first average traffic speed with a first lane of the first road segment; and associating, by the one or more computing devices, the second average traffic speed with a second lane of the first road segment.

9. The computer-implemented method of claim 1, wherein each of the plurality of average traffic speeds is associated with one or more lanes of the first road segment.

10. The computer-implemented method of claim 1, wherein transmitting the map data corresponding to the at least one of the plurality of traffic types comprises:

transmitting, by the one or more computing devices, a plurality of routing or navigation options including at least a first routing option corresponding to the first average traffic speed and a second routing option corresponding to the second average traffic speed.

11. The computer-implemented method of claim 1, wherein the request includes the first traffic type, and the map data includes traffic condition information about different lanes among the first road segment.

12. The computer-implemented method of claim 11, wherein the map data corresponds to two or more of the plurality of traffic types, wherein the map data includes a comparison between the first traffic type and at least a second traffic type from the plurality of traffic types.

13. The computer-implemented method of claim 1, wherein the request is a routing request, and the transmitted map data includes first routing data based on the first average traffic speed and second routing data based on the second average traffic speed.

14. A computing system, comprising:

a computer-readable medium configured to store instructions; and one or more processors configured to execute the instructions to perform operations, the operations comprising:

obtaining traffic sample data associated with a first direction of traffic on a first road segment, the traffic sample data including data indicative of a plurality of movement speeds associated with a plurality of objects, determining a plurality of average traffic speeds for the first direction of traffic on the first road segment based at least in part on the plurality of movement speeds, associating each of the plurality of average traffic speeds with at least one of a plurality of traffic types, a first average traffic speed among the plurality of average traffic speeds corresponding to a first traffic type among the plurality of traffic types and a second average traffic speed among the plurality of average traffic speeds corresponding to a second traffic type among the plurality of traffic types, determining map data based at least in part on the plurality of traffic types and associated average traffic speeds, and in response to receiving a request, transmitting, by the computing system to a client device, map data corresponding to at least one of the plurality of traffic types for presentation, via a user interface of the client device, to a user associated with the client device.

15. The computing system of claim 14, wherein determining the plurality of average traffic speeds for the first direction of traffic on the first road segment based at least in part on the plurality of movement speeds comprises:

determining a distribution of the plurality of movement speeds;

identifying a plurality of peaks based on the distribution of the plurality of movement speeds, each peak from the plurality of peaks associated with a subset of the plurality of movement speeds; and determining an average traffic speed for each peak from the plurality of peaks based at least in part on an average of the subset of movement speeds associated with the peak.

16. The computing system of claim 15, wherein identifying the plurality of peaks based on the distribution of the plurality of movement speeds, each peak from the plurality of peaks associated with a subset of the plurality of movement speeds, comprises:

Identifying a first peak from the plurality of peaks based at least in part on a first cluster of the plurality of movement speeds distributed around the first peak, the subset of the plurality of movement speeds associated with the first peak corresponding to the first cluster; and Identifying a second peak from the plurality of peaks based at least in part on a second cluster of the plurality of movement speeds distributed around the second peak, the subset of the plurality of movement speeds associated with the second peak corresponding to the second cluster.

17. The computing system of claim 15, wherein the operations further comprise:

associating the average traffic speed for each peak from the plurality of peaks with a different traffic type from the plurality of traffic types.

18. The computing system of claim 14, wherein associating each of the plurality of average traffic speeds with the at least one of the plurality of traffic types comprises:

associating an average traffic speed from the plurality of average traffic speeds with a traffic type from the plurality of traffic types, based at least in part on a value of the average traffic speed relative to the plurality of average traffic speeds.

19. The computing system of claim 14, wherein associating each of the plurality of average traffic speeds with the at least one of the plurality of traffic types comprises:

associating an average traffic speed with a lowest value from the plurality of average traffic speeds with the first traffic type from the plurality of traffic types; and associating an average traffic speed with a highest value from the plurality of average traffic speeds with the second traffic type from the plurality of traffic types.

20. A computing system, comprising:

a computer-readable medium configured to store instructions; and one or more processors configured to execute the instructions to perform operations, the operations comprising:

obtaining traffic sample data associated with a first direction of traffic on a first road segment, the traffic sample data including data indicative of a plurality of movement speeds associated with a plurality of objects;

determining a plurality of average traffic speeds for the first direction of traffic on the first road segment based at least in part on the plurality of movement speeds;

associating each of the plurality of average traffic speeds with at least one of a plurality of traffic types;

determining map data based at least in part on the plurality of traffic types and associated average traffic speeds; and in response to receiving a request, transmitting to a client device, map data corresponding to at least one of the plurality of traffic types for presentation, via a user interface of the client device, to a user associated with the client device, wherein transmitting the map data corresponding to the at least one of the plurality of traffic types comprises:

transmitting a plurality of routing or navigation options including at least a first routing option corresponding to a first average traffic speed associated with a first traffic type and a second routing option corresponding to a second average traffic speed associated with a second traffic type.

* * * * *